United States Patent
Takahashi et al.

(10) Patent No.: US 11,841,689 B2
(45) Date of Patent: Dec. 12, 2023

(54) POLICY CREATION APPARATUS, CONTROL APPARATUS, POLICY CREATION METHOD, AND NON-TRANSITORY COMPUTER READABLE MEDIUM STORING POLICY CREATION PROGRAM

(71) Applicants: NEC CORPORATION, Tokyo (JP); NATIONAL INSTITUTE OF ADVANCED INDUSTRIAL SCIENCE AND TECHNOLOGY, Tokyo (JP)

(72) Inventors: Yukiko Takahashi, Tokyo (JP); Takuya Hiraoka, Tokyo (JP); Yoshimasa Tsuruoka, Tokyo (JP)

(73) Assignees: NEC CORPORATION, Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 223 days.

(21) Appl. No.: 17/418,526

(22) PCT Filed: Sep. 10, 2019

(86) PCT No.: PCT/JP2019/035576
§ 371 (c)(1),
(2) Date: Jun. 25, 2021

(87) PCT Pub. No.: WO2020/137019
PCT Pub. Date: Jul. 2, 2020

(65) Prior Publication Data
US 2022/0100154 A1 Mar. 31, 2022

(30) Foreign Application Priority Data
Dec. 27, 2018 (JP) ................................. 2018-244598

(51) Int. Cl.
*G05B 13/02* (2006.01)
*G05B 15/02* (2006.01)

(52) U.S. Cl.
CPC ........... *G05B 13/028* (2013.01); *G05B 15/02* (2013.01)

(58) Field of Classification Search
CPC .... G05B 13/028; G05B 15/02; G05B 13/029; G06N 20/00
See application file for complete search history.

(56) References Cited

U.S. PATENT DOCUMENTS 5,282,149 A * 1/1994 Grandone ........ G05B 19/41865
702/19
6,356,158 B1 * 3/2002 Lesea .................... H03L 7/0997
331/8

(Continued)

FOREIGN PATENT DOCUMENTS

JP 5-282149 A 10/1993
JP 2621658 B2 6/1997

(Continued)

OTHER PUBLICATIONS

Office Action dated Aug. 30, 2022 from the Japanese Patent Office in JP Application No. 2020-562349.

(Continued)

*Primary Examiner* — Ramesh B Patel
(74) *Attorney, Agent, or Firm* — Sughrue Mion, PLLC

(57) ABSTRACT

A policy creation unit creates a plurality of policies each including a predetermined number of rules in which a condition for determining a state of an object is combined with an action in the state. An action determination unit determines, for each of the plurality of created policies, an action to be performed while a state of the object is changed from a first state to a second state in accordance with the policy. A policy evaluation unit determines, in accordance (Continued)

with a difference between a state between the first state and the second state and a desired state, the quality of the determined action and determines, for each of the plurality of policies, the quality of the policy based on the determined quality of the action. A policy selection unit selects the policy that is determined to have a high quality.

11 Claims, 17 Drawing Sheets

(56) References Cited

U.S. PATENT DOCUMENTS

| | | | | |
|---|---|---|---|---|
| 8,856,437 | B2* | 10/2014 | Sims | G06F 3/065 |
| | | | | 711/111 |
| 9,262,643 | B2* | 2/2016 | Cidon | G06F 16/137 |
| 9,424,187 | B1* | 8/2016 | Todd | G06F 12/00 |
| 10,379,761 | B2* | 8/2019 | Mutha | G06F 3/067 |
| 11,435,705 | B2* | 9/2022 | Wee | G05B 13/028 |
| 2003/0214388 | A1* | 11/2003 | Stuart | G08B 13/2462 |
| | | | | 340/10.1 |
| 2008/0101282 | A1* | 5/2008 | Ogura | H04W 72/30 |
| | | | | 370/328 |
| 2009/0144568 | A1* | 6/2009 | Fung | G06F 1/324 |
| | | | | 713/300 |
| 2012/0254081 | A1* | 10/2012 | Kamioka | G06N 7/01 |
| | | | | 706/12 |
| 2017/0206353 | A1* | 7/2017 | Jai | G06F 21/565 |
| 2020/0300495 | A1* | 9/2020 | Kingetsu | F24F 11/64 |
| 2021/0103255 | A1* | 4/2021 | Jha | G05B 13/0265 |
| 2021/0157285 | A1* | 5/2021 | Ueyama | G06N 20/00 |

FOREIGN PATENT DOCUMENTS

| | | |
|---|---|---|
| JP | 2003-233503 A | 8/2003 |
| JP | 2012-208902 A | 10/2012 |

OTHER PUBLICATIONS

Richard S. Sutton, et al., "Reinforcement Learning: An Introduction", The MIT Press, Nov. 5, 2017, Second edition, A Bradford Book, The MIT Press, Cambridge, Massachusetts, London, England, pp. 1-445.

International Search Report for PCT/JP2019/035576 dated Nov. 26, 2019.

Written Opinion for PCT/JP2019/035576 dated Nov. 26, 2019.

* cited by examiner

POLICY CREATION APPARATUS, CONTROL APPARATUS, POLICY CREATION METHOD, AND NON-TRANSITORY COMPUTER READABLE MEDIUM STORING POLICY CREATION PROGRAM

CROSS REFERENCE TO RELATED APPLICATIONS

This application is a National Stage of International Application No. PCT/JP2019/035576 filed Sep. 10, 2019, claiming priority based on Japanese Patent Application No. 2018-244598 filed Dec. 27, 2018, the disclosure of which is incorporated herein in its entirety by reference.

TECHNICAL FIELD

The present disclosure relates to a policy creation apparatus, a control apparatus, a policy creation method, and a non-transitory computer readable medium storing a policy creation program, and more specifically, to a policy creation apparatus configured to create policies, a control apparatus, a policy creation method, and a non-transitory computer readable medium storing a policy creation program.

BACKGROUND ART

Workers in processing plants, etc. are able to manufacture high-quality products by familiarizing themselves with work procedures for creating products from materials. In the work procedures, for example, the workers process the materials using processing machines. Work procedures for manufacturing good products are accumulated as know-how for each worker. In order to transfer the know-how from workers who are familiar with the work procedures to other workers, however, skilled workers need to teach how to use the processing machines, amounts of materials, timings to put the materials into the processing machines, etc. to other workers. Therefore, the transfer of know-how requires a long period of time and a lot of work.

As illustrated in Non-Patent Literature 1, as a method of learning the above know-how by machine learning, a reinforcement learning method may be used. In the reinforcement learning method, policies indicating the know-how are expressed by a form of models. In Non-Patent Literature 1, these models are expressed by a neural network.

CITATION LIST

Non-Patent Literature

[Non-Patent Literature 1] Richard S. Sutton and Andrew G. Barto, Reinforcement Learning: An Introduction, The MIT Press, 2017

SUMMARY OF INVENTION

Technical Problem

However, it is difficult for a user to understand how the know-how has been expressed. The reason therefor is that, since the reinforcement learning method illustrated in Non-Patent Literature 1 expresses the policies indicating the know-how by a neural network, it is difficult for the user to understand the models created by the neural network.

The present disclosure has been made in order to solve the aforementioned problem and an object of the present disclosure is to provide a policy creation apparatus, a control apparatus, a policy creation method, and a policy creation program capable of creating policies with high quality and high visibility.

Solution to Problem

A policy creation apparatus according to the present disclosure includes: policy creation means for creating a plurality of policies each including a predetermined number of rules in which a condition for determining a state of an object is combined with an action in the state; action determination means for determining, for each of the plurality of policies that have been created, an action to be performed while a state of the object is changed from a first state to a second state in accordance with the policy; policy evaluation means for determining, in accordance with a difference between a state between the first state and the second state and a desired state, the quality of the determined action and determining, for each of the plurality of policies, the quality of the policy based on the determined quality of the action; and policy selection means for selecting the policy that is determined to have a high quality from among the plurality of policies that have been created.

Further, a policy creation method according to the present disclosure includes: creating a plurality of policies each including a predetermined number of rules in which a condition for determining a state of an object is combined with an action in the state; determining, for each of the plurality of policies that have been created, an action to be performed while a state of the object is changed from a first state to a second state in accordance with the policy; and determining, in accordance with a difference between a state between the first state and the second state and a desired state, the quality of the determined action and determining, for each of the plurality of policies, the quality of the policy based on the determined quality of the action; and selecting the policy that is determined to have a high quality from among the plurality of policies that have been created.

Further, a policy creation program according to the present disclosure causes a computer to achieve: a function of creating a plurality of policies each including a predetermined number of rules in which a condition for determining a state of an object is combined with an action in the state; a function of determining, for each of the plurality of policies that have been created, an action to be performed while a state of the object is changed from a first state to a second state in accordance with the policy; a function of determining, in accordance with a difference between a state between the first state and the second state and a desired state, the quality of the determined action and determining, for each of the plurality of policies, the quality of the policy based on the determined quality of the action; and a function of selecting the policy that is determined to have a high quality from among the plurality of policies that have been created.

Advantageous Effects of Invention

According to the present disclosure, it is possible to provide a policy creation apparatus, a control apparatus, a policy creation method, and a policy creation program capable of creating policies with high quality and high visibility.

DESCRIPTION OF EMBODIMENTS

First Example Embodiment

Hereinafter, with reference to the drawings, example embodiments will be described. For the sake of clarification of the description, the following descriptions and the drawings are omitted and simplified as appropriate. Further, throughout the drawings, the same components are denoted by the same reference symbols and overlapping descriptions are omitted as appropriate.

Figure 1:
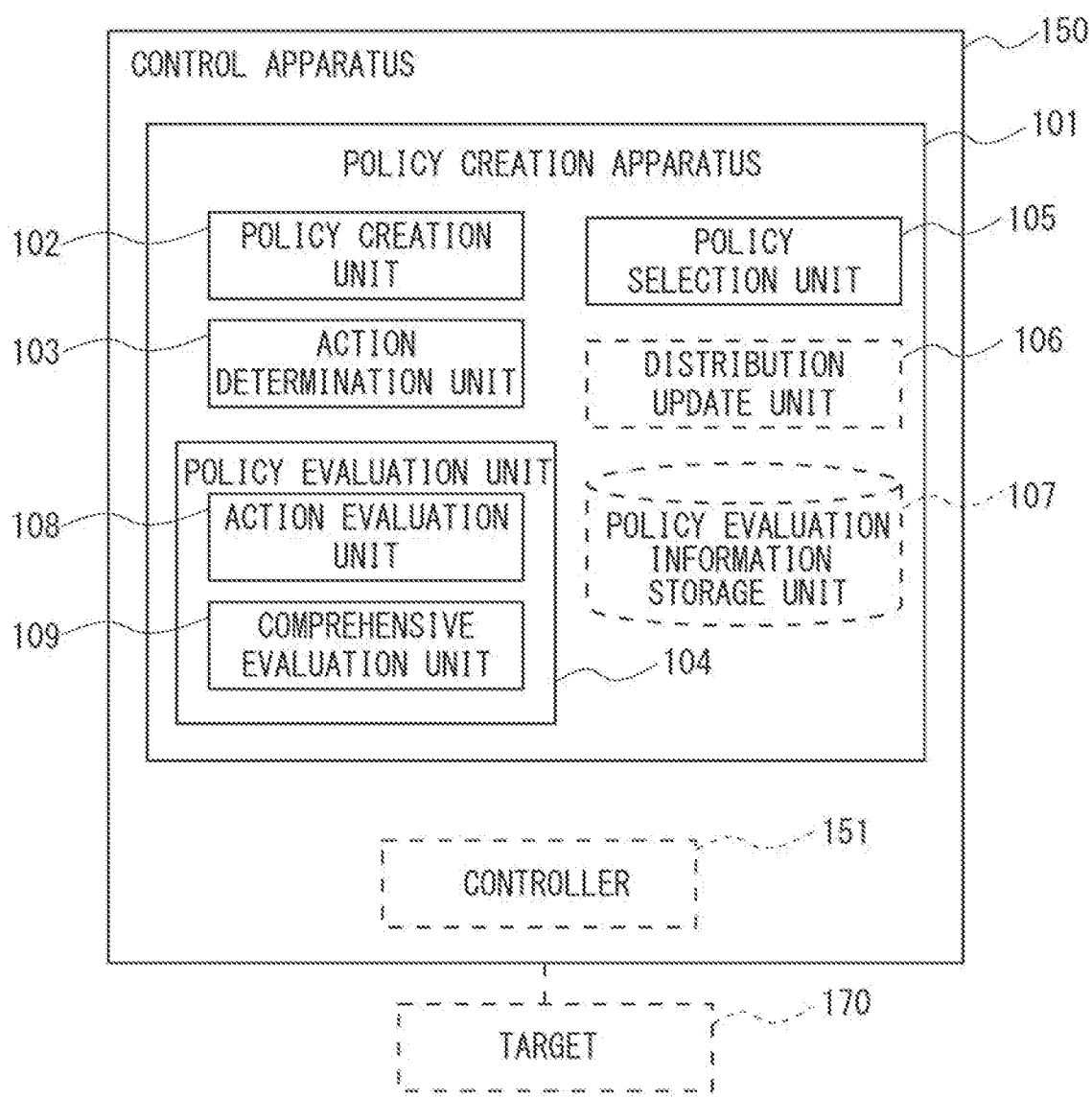
FIG. 1 is a block diagram showing a configuration of a policy creation apparatus according to a first example embodiment.
Figure 2:
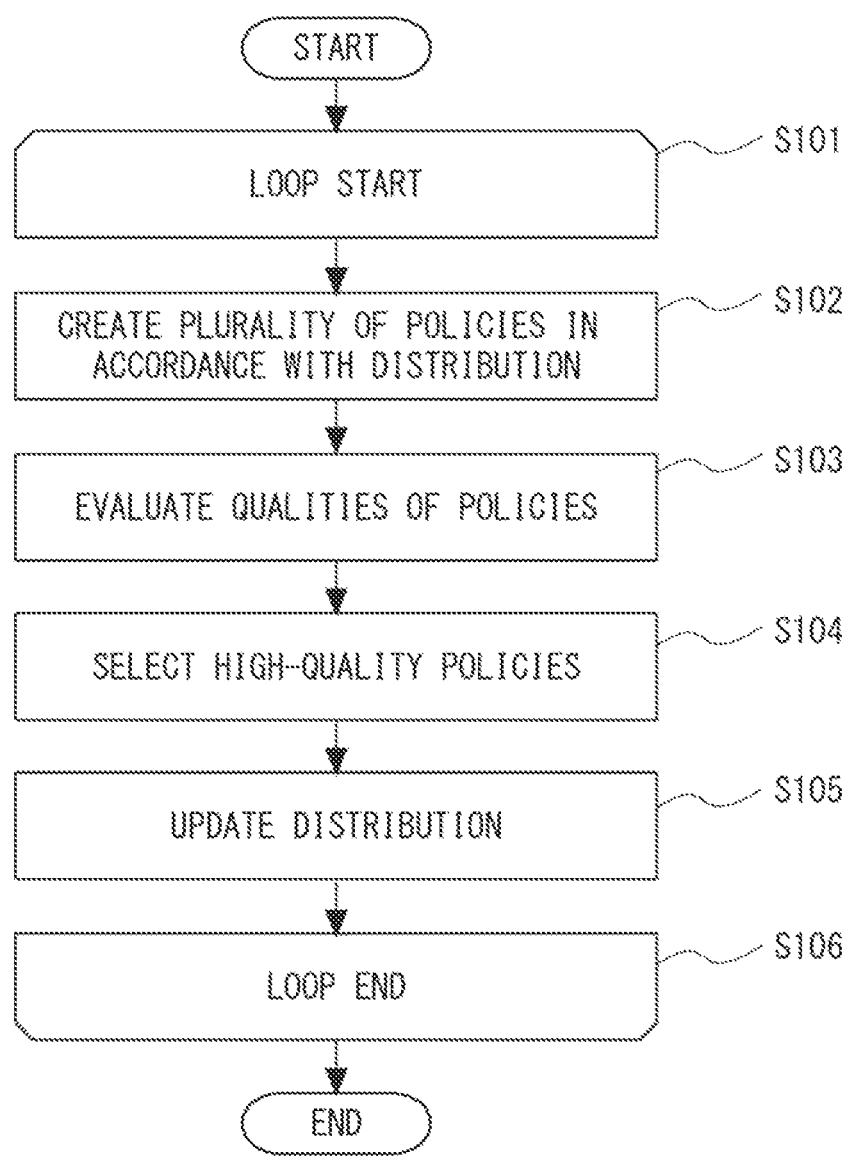
FIG. 2 is a flowchart showing a flow of a policy creation method executed by the policy creation apparatus according to the first example embodiment.

FIG. 1 is a block diagram showing a configuration of a policy creation apparatus 101 according to a first example embodiment. Further, FIG. 2 is a flowchart showing a flow of a policy creation method executed by the policy creation apparatus 101 according to the first example embodiment. Note that the flowchart shown in FIG. 2 will be described later.

With reference to FIG. 1, a configuration of the policy creation apparatus 101 according to the first example embodiment of the present disclosure will be described in detail. The policy creation apparatus 101 according to the first example embodiment includes a policy creation unit 102, an action determination unit 103, a policy evaluation unit 104, and a policy selection unit 105. The policy evaluation unit 104 includes an action evaluation unit 108 and a comprehensive evaluation unit 109. The policy creation apparatus 101 may further include a distribution update unit 106 and a policy evaluation information storage unit 107. The policy creation unit 102, the action determination unit 103, the policy evaluation unit 104, and the policy selection unit 105 respectively include functions as policy creation means, action determination means, policy evaluation means, and policy selection means. Further, the action evaluation unit 108 and the comprehensive evaluation unit 109 respectively include functions as action evaluation means and comprehensive evaluation means. The distribution update unit 106 and the policy evaluation information storage unit 107 respectively include functions as distribution update means and policy evaluation information storage means.

The policy creation apparatus 101 executes processing in, for example, a control apparatus 150. The control apparatus 150 includes the policy creation apparatus 101 and a controller 151. The controller 151 executes control regarding a target 170 in accordance with an action determined according to a policy created by the policy creation apparatus 101.

In the policy creation apparatus 101, the policy creation unit 102 creates a policy for determining an action to be taken regarding the target 170. The policy creation unit 102 generates policy information, which is information indicating the policy. The details of the policy will be described later with reference to FIG. 4 or 5.

Figure 3:
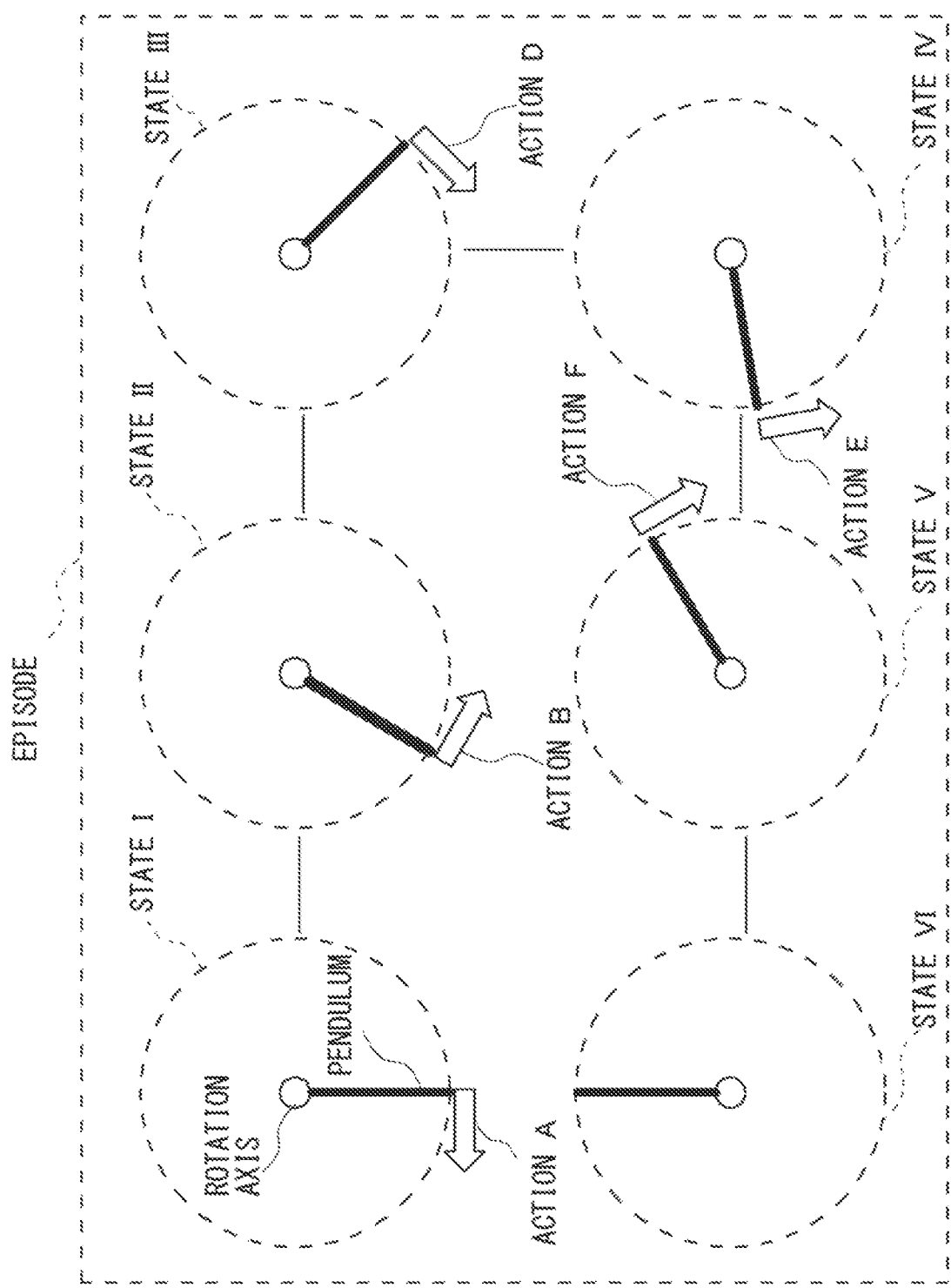
FIG. 3 is a diagram conceptually showing one example of a target according to the first example embodiment.
Figure 4:
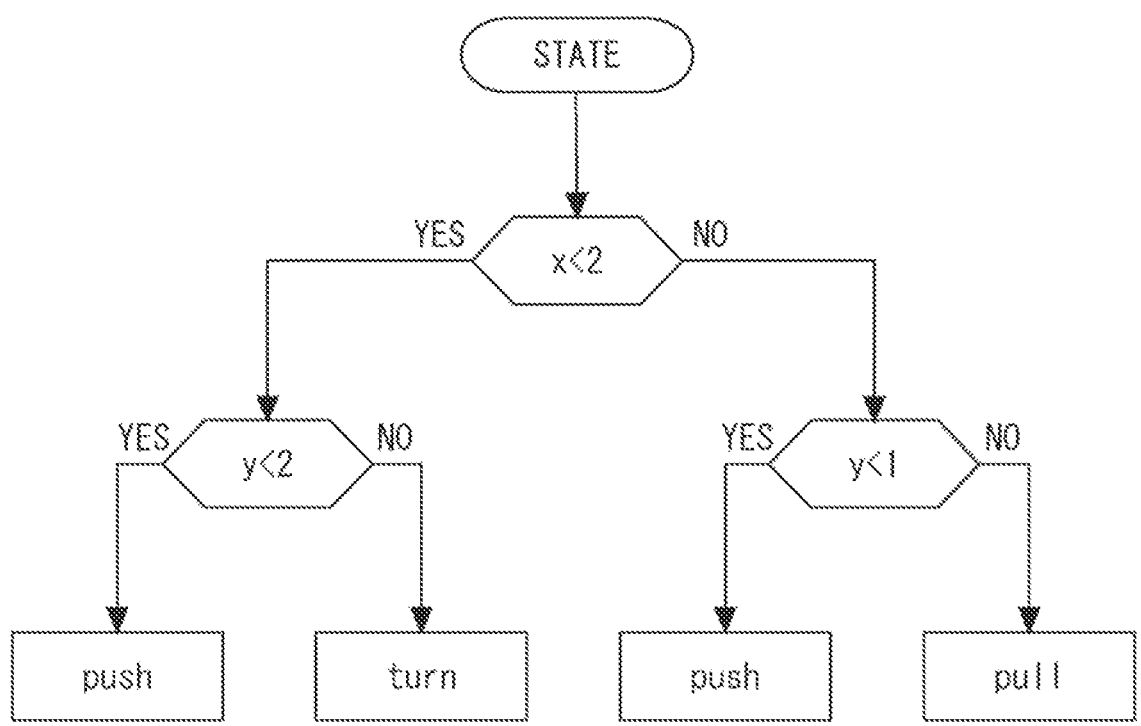
FIG. 4 is a diagram conceptually showing one example of policy information according to the first example embodiment.
Figure 5:
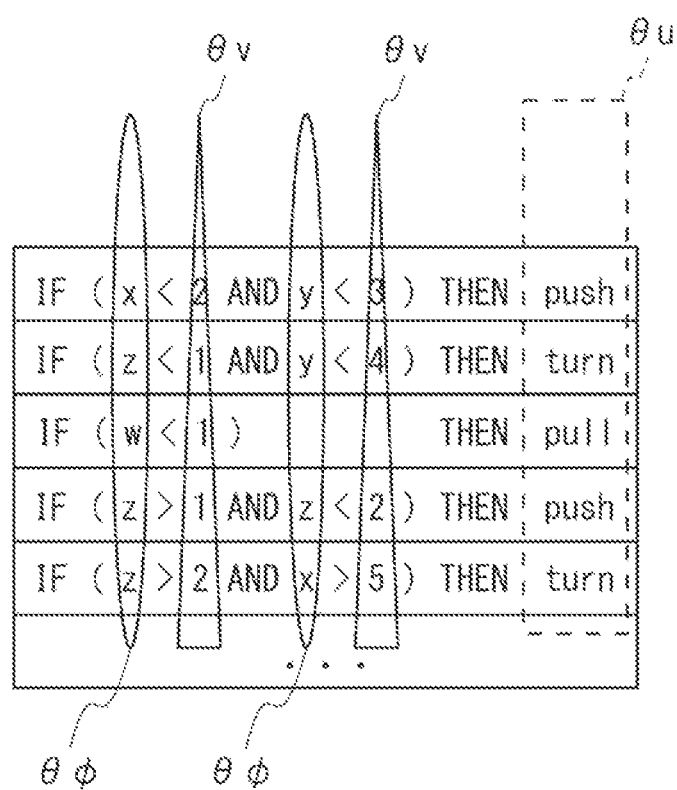
FIG. 5 is a diagram conceptually showing one example of policy information according to the first example embodiment.

FIG. 3 is a diagram conceptually showing one example of the target 170 according to the first example embodiment. FIG. 4 is a diagram conceptually showing one example of the policy information according to the first example embodiment. FIG. 5 is a diagram conceptually showing one example of the policy information according to the first example embodiment. The details of FIGS. 3 to 5 will be described later.

Figure 6:
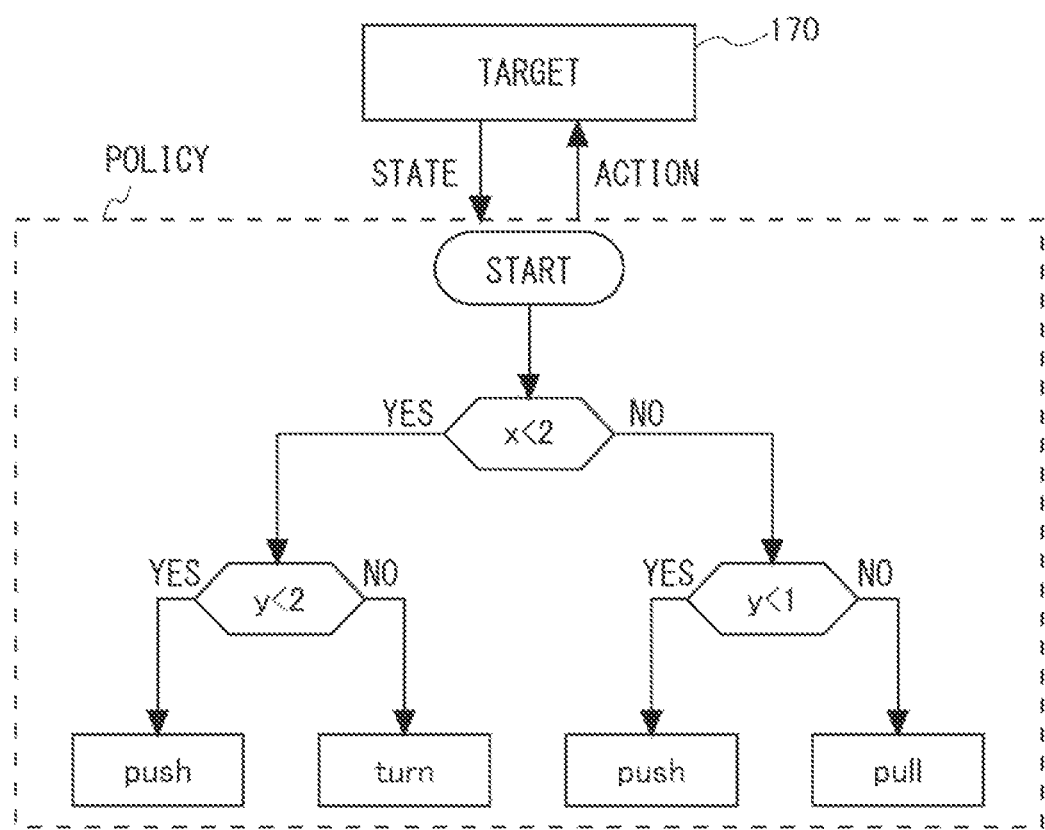
FIG. 6 is a diagram conceptually showing processing of determining an action in accordance with a policy according to the first example embodiment.

FIG. 6 is a diagram conceptually showing processing of determining an action in accordance with a policy according to the first example embodiment. As illustrated in FIG. 6, in the policy creation apparatus 101, the action determination unit 103 acquires information indicating a state of the target 170. Then the action determination unit 103 determines an action to be taken regarding the target 170 in accordance with the created policy. The state of the target 170 (i.e., object) can be expressed, for example, by observation values output by a sensor that observes the target 170. The sensor is, for example, a temperature sensor, a position sensor, a velocity sensor, an acceleration sensor or the like. The policy illustrated in FIG. 6 will be described later with reference to FIG. 4.

When, for example, the target 170 is a vehicle such as a self-driving vehicle, the action determination unit 103 acquires, for example, observation values (feature amounts) such as the number of rotations of an engine, the velocity of the vehicle, a surrounding environment and the like. The action determination unit 103 determines an action by executing processing that will be described later with reference to FIG. 2 based on these observation values (feature amounts). Specifically, the action determination unit 103 determines an action such as turning the steering wheel to the right, pressing the accelerator, or applying brakes. The controller 151 controls the accelerator, the steering wheel, or the brakes according to the action determined by the action determination unit 103.

Further, when, for example, the target 170 is a power generator, the action determination unit 103 acquires, for example, observation values (feature amounts) such as the number of rotations of a turbine, the temperature of an incinerator, or the pressure of the incinerator. The action determination unit 103 determines an action by executing processing that will be described later with reference to FIG. 2 based on these observation values (feature amounts). Specifically, the action determination unit 103 determines an action such as increasing or decreasing an amount of fuel. The controller 151 executes control such as closing or opening a valve for adjusting the amount of fuel in accordance with the action determined by the action determination unit 103.

In the following description, the kinds of the observation (velocity, the number of rotations etc.) may be expressed as feature parameters (or feature amounts) and values observed regarding these kinds may be expressed as feature parameter values (or values of the feature amounts). The policy creation apparatus 101 acquires action evaluation information indicating the level of the quality of the action that has been determined. The policy creation apparatus 101 creates a high-quality policy based on the acquired action evaluation information. The policy indicates information that is a basis for determining the action to be taken regarding the target 170 when the target 170 is in one state, as illustrated in FIGS. 4 and 5. The policy will be described later with reference to FIGS. 4 and 5.

Figure 7:
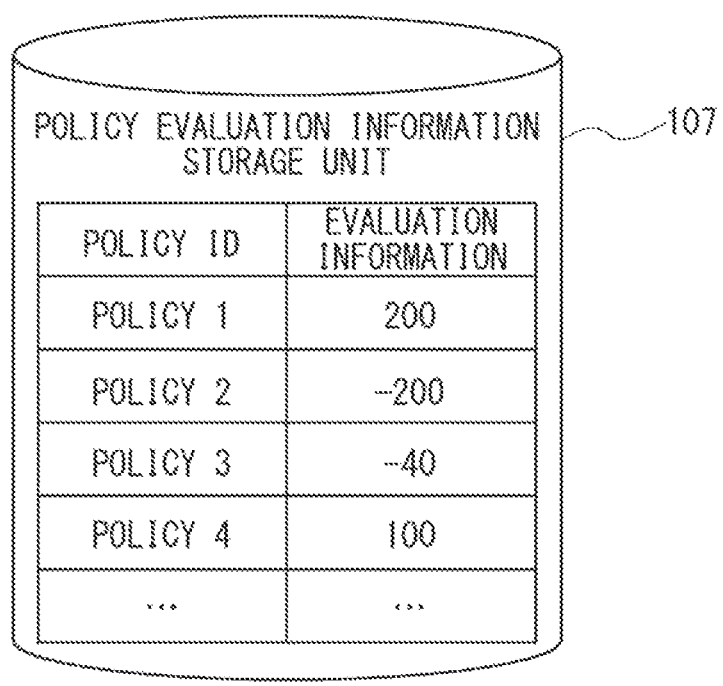
FIG. 7 is a diagram conceptually showing one example of policy evaluation information stored in a policy evaluation information storage unit according to the first example embodiment.

FIG. 7 is a diagram conceptually showing one example of policy evaluation information stored in the policy evaluation information storage unit 107 according to the first example embodiment. As illustrated in FIG. 7, the policy evaluation information storage unit 107 may store policy evaluation information in which an identifier (hereinafter it will be referred to as an "ID") indicating one policy is associated with evaluation information calculated with regard to this policy. The evaluation information will be described later with reference to FIG. 11.

For example, in the policy evaluation information illustrated in FIG. 7, an identifier "ID1 (policy 1)" and the evaluation information "200" are associated with each other. This indicates that the evaluation information indicating the quality of the policy is "200" regarding the policy indicated by the identifier "ID1". Further, in the policy evaluation information illustrated in FIG. 7, an identifier "ID3 (policy 3)" and the evaluation information "−40" are associated with each other. This indicates that the evaluation information indicating the quality of the policy is "−40" regarding the policy indicated by the identifier "ID3".

It is assumed, in the following description, that the larger the value of the evaluation information is, the higher the quality of the corresponding policy becomes, whereas the smaller the value of the evaluation information is, the lower the quality of the corresponding policy becomes for the sake of convenience of description. In this case, the policy evaluation information illustrated in FIG. 7 indicates, for example, that the quality of the policy 1 is higher than that of the policy 3. Further, the policy evaluation information may further include, for example, information indicating a policy that an identifier indicates (e.g., the one illustrated in FIGS. 4 and 5). That is, the policy evaluation information is not limited to the above-described example.

Referring next to FIG. 3, terms used herein will be described. The target 170 illustrated in FIG. 3 includes a rod-shaped pendulum and a rotation axis capable of applying torque to the pendulum. As state I indicates an initial state of the target 170 and the pendulum is present below the rotation axis. A state VI indicates an end state of the target 170, in which the pendulum is present above the rotation axis in an inverted state. Actions A to F indicate forces of applying torque to the pendulum. Further, states I to VI indicate states of the target 170. Further, regarding the state of the target 170, the respective states from the first state to the second state are collectively expressed by an "episode". The episode may not necessarily indicate each state from the initial state to the end state and may indicate, for example, each state from a state II to a state III or each state from the state III to the state VI.

The policy creation apparatus 101 creates, for example, a policy for determining a series of actions that may achieve the state VI, starting from the state I (illustrated in FIGS. 4 and 5) based on the action evaluation information regarding an action. The processing in which the policy creation apparatus 101 creates the policy will be described later with reference to FIG. 8.

Referring next to FIG. 4, the policy information created by the policy creation apparatus 101 will be described. The policy information is information for determining the action to be taken regarding the target 170. Specifically, the policy information includes at least one rule in which an action is associated with a condition for determining whether or not to execute the action. This condition is a condition for determining the state of the target 170. The "rule" will be described later.

In the tree structure illustrated in FIG. 4, information indicating conditions ("x<2", "y<2", and "y<1") for determining the action to be taken regarding the target 170 is arranged in non-terminal nodes. The "non-terminal nodes" correspond to the root node and intermediate nodes, that is, nodes other than the leaf nodes (terminal nodes).

It is further assumed, for the sake of convenience of description, that the state of the target 170 is expressed by two feature parameters x and y. The feature parameter x indicates, for example, the position of the target 170. The feature parameter y indicates, for example, the velocity of the target 170. The number of feature parameters indicating the state of the target 170 may be other than two; it may be one or three or larger. Further, the policy information does not necessarily include all the feature parameters observed regarding the state of the target 170 and may include only some of the observed feature parameters. The policy information may include, for example, only the feature parameter x.

As illustrated in FIG. 4, the action to be taken regarding the target 170 in accordance with the policy information is determined based on the observation values (feature parameter values) regarding feature parameters that indicate the state of the target 170. Assume here, for example, that the target 170 is in a state in which the value of the feature parameter x is 1 and the value of the feature parameter y is 3. In this case, the policy creation apparatus 101 receives each of the feature parameter values (x=1, y=3) indicating this state. Next, the policy creation apparatus 101 first determines whether or not the condition "x<2" is established in the root node. In this case, since "x<2" (YES in condition "x<2"), the policy creation apparatus 101 determines whether or not the condition "y<2" is established in the intermediate node. In this case, since "y>2" (NO in condition "y<2"), the policy creation apparatus 101 determines the action "turn".

It is further assumed, for example, that the target 170 is in a state in which the value of the feature parameter x is 3 and the value of the feature parameter y is 1. In this case, the policy creation apparatus 101 receives each of the feature parameter values (x=3, y=1) indicating this state. Next, the policy creation apparatus 101 determines whether the condition "x<2" is established in the root node. In this case, since "x>2" (NO in the condition "x<2"), the policy creation apparatus 101 determines whether or not the condition "y<1" is established in the intermediate node. In this case, since "y=1" (NO in the condition "y<1"), the policy creation apparatus 101 determines the action "pull".

In other words, in the respective non-terminal nodes (e.g., "x<2", "y<1", and "y<2") in the tree structure, conditions for determining the state are arranged. Further, in the leaf nodes (terminal nodes) in the tree structure, actions in a case in which the target 170 is in a state in accordance with these conditions are arranged. Therefore, when the number of actions is a predetermined number, the tree structure indicating the policy for determining this action includes a predetermined number of rules. The "rule" here means a set of conditions to reach one action. In the example shown in FIG. 4, the rule regarding the action "turn" is, for example, a rule that the action "turn" is selected when "x<2 is satisfied but y<2 is not satisfied". Further, the rule regarding the action "pull" is, for example, a rule that the action "pull" is selected when "x<2 is not satisfied and y<1 is not satisfied".

Note that, in the tree structure, the distances from the root node (in this example, "x<2") to the respective leaf nodes are not necessarily constant and may be different from one another. Further, the policy information may not be necessarily expressed using a tree structure and may include at least one rule for determining the action to be taken regarding the target 170, as illustrated in FIG. 5.

Further, the action to be taken regarding the target 170 may affect the state of this target 170. Therefore, since the target 170 is affected by this action, the state of the target 170 may change from a first state to a second state. In this case, it can also be regarded that a condition for determining whether to execute an action indicates the first state in the policy information as described above. Further, since the second state occurs by applying an action while the target 170 is in the first state, information indicating the second state (i.e., the next state of the target 170) may be arranged in the leaf nodes instead of arranging information indicating the actions in the leaf nodes in the policy information.

Further, as illustrated in FIG. 5, the policy information may be expressed in accordance with a list form including a predetermined number of rules. The policy information illustrated in FIG. 5 includes a rule "IF (x<2 AND y<3) THEN push". This rule indicates that it is determined to perform the action "push" regarding the target 170 when the observation value x is smaller than two and the observation value y is smaller than three. Further, the policy information illustrated in FIG. 5 includes a rule "IF (w<1) THEN pull". This rule indicates that it is determined to perform the action "pull" regarding the target 170 when the observation value w is smaller than one.

Besides the rules illustrated in FIG. 5, a rule such as "IF (x=2 AND y=STOP) THEN push" in which a conditions is expressed by an exact value or determination on a state, not by thresholds, may be included. That is, the policy information is not limited to the examples illustrated in FIGS. 4 and 5. The parameters $\theta_\varphi$, $\theta_\nu$, and $\theta_u$ shown in FIG. 5 will be described later.

Referring next to FIG. 2, processing in the policy creation apparatus 101 according to the first example embodiment of the present disclosure will be described in detail. The policy creation unit 102 creates a plurality of policies in accordance with one distribution (probability distribution) (Step S102). The processing in Step S102 will be described later in detail with reference to FIG. 8. The "distribution" may be, for example, a Gaussian distribution. In the first processing of S102, parameters of the distribution (mean, standard deviation and the like) may be any desired (i.e., random) values.

Next, the action determination unit 103 determines an action in accordance with the policies created by the policy creation unit 102 and the policy evaluation unit 104 evaluates the qualities of the policies based on the quality of the action that has been determined (Step S103). The policy evaluation unit 104 evaluates, regarding each of the policies created by the policy creation unit 102, the quality of the policy. In the processing in Step S103, the policy evaluation unit 104 may determine the quality of the action based on, for example, the quality of a state included in the episode described above with reference to FIG. 3. As described above with reference to FIG. 3, the action performed in one state may be associated with the next state in the target 170. Therefore, the policy evaluation unit 104 uses the quality of the state (next state) as the quality of the action that achieves this state (next state). In the example of the inverted pendulum as illustrated in FIG. 3, for example, the quality of the state may be expressed by a value indicating the difference between a target state (e.g., an end state; an inverted state) and the above state. The details of the processing in Step S103 will be described later in detail FIG. 11.

Next, the policy selection unit 105 selects high-quality policies from among a plurality of policies based on the qualities evaluated by the policy evaluation unit 104 (Step S104). The policy selection unit 105 selects, for example, policies whose quality levels are high from among the plurality of policies. Alternatively, the policy selection unit 105 selects, for example, policies whose qualities are equal to or higher than the average from among the plurality of policies. Alternatively, the policy selection unit 105 selects, for example, policies whose qualities are equal to or higher than a desired quality from among the plurality of policies. Alternatively, the policy selection unit 105 may select a policy whose quality is the highest from among the policies created in the iteration from Steps S101 to S106. The processing of selecting policies is not limited to the above-described example.

Next, the distribution update unit 106 updates the distribution that is a basis for creating the policies in Step S102 (Step S105). The distribution update unit 106 updates the distribution by calculating, regarding each of the parameters included in the policies selected by the policy selection unit 105, for example, the mean and standard deviation of the parameter values. That is, the distribution update unit 106 updates, using policy parameters indicating the policies selected by the policy selection unit 105, a distribution regarding the policy parameters. The policy parameters will be described later.

The iteration processing from Step S101 (loop start) to Step S106 (loop end) is repeated, for example, a given number of times. Alternatively, this iteration processing may be repeated until the qualities of the policies become equal to or larger than a predetermined criterion. By repeatedly executing the processing from Steps S101 to S106, the distribution that is a basis for creating the policies tends to gradually approach a distribution in which observation values regarding the target 170 are reflected. The policies in accordance with the target 170 can thus be created.

The action determination unit 103 may receive observation values indicating the state of the target 170 and determines the action to be taken regarding the target 170 in accordance with the input observation values and the policy whose quality is the highest. The controller 151 may further control the action to be taken regarding the target 170 in accordance with the action determined by the action determination unit 103.

Figure 8:
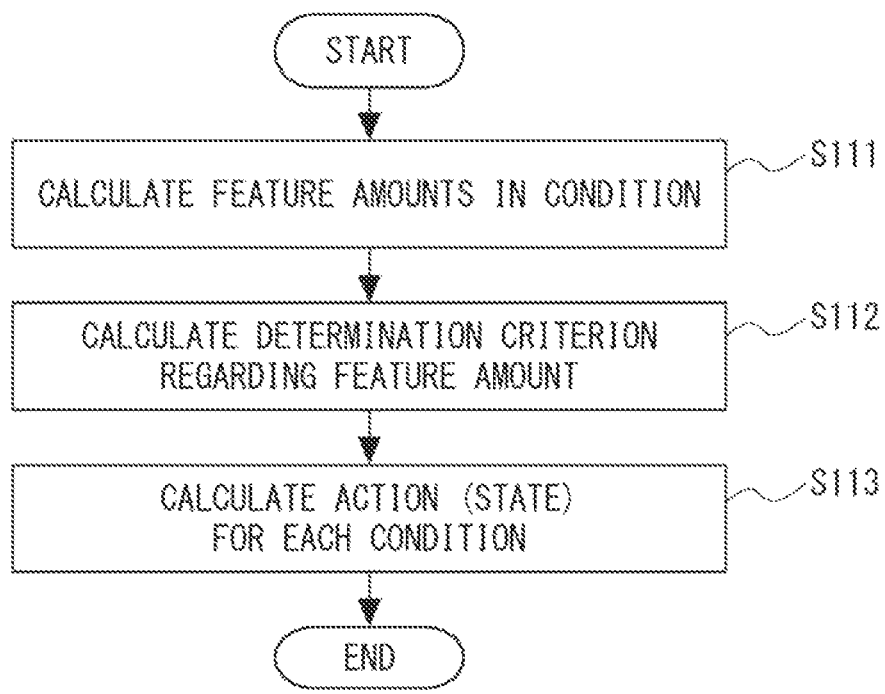
FIG. 8 is a flowchart showing a flow of processing in a policy creation unit according to the first example embodiment.
Figure 9:
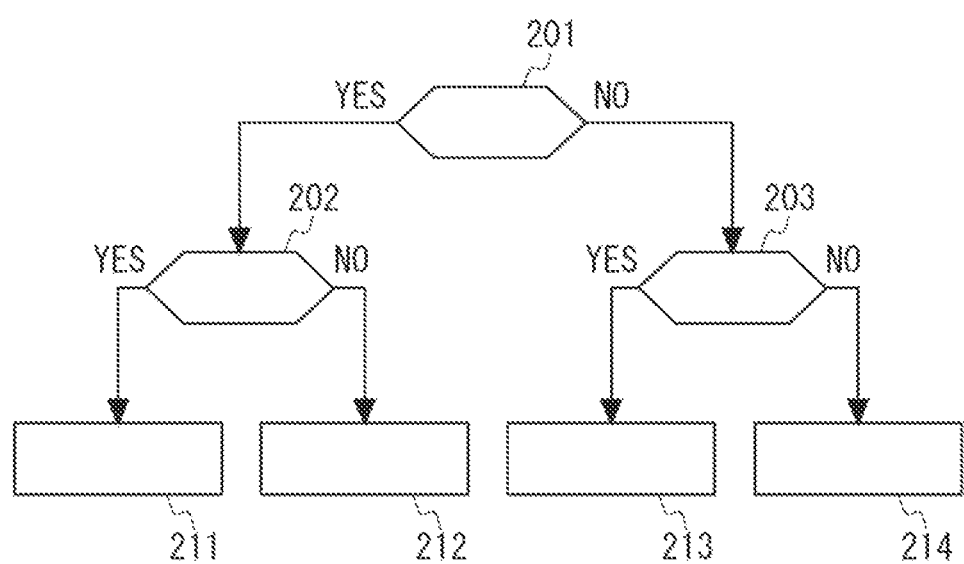
FIG. 9 is a diagram conceptually showing an initial state of a policy according to the first example embodiment.
Figure 10:
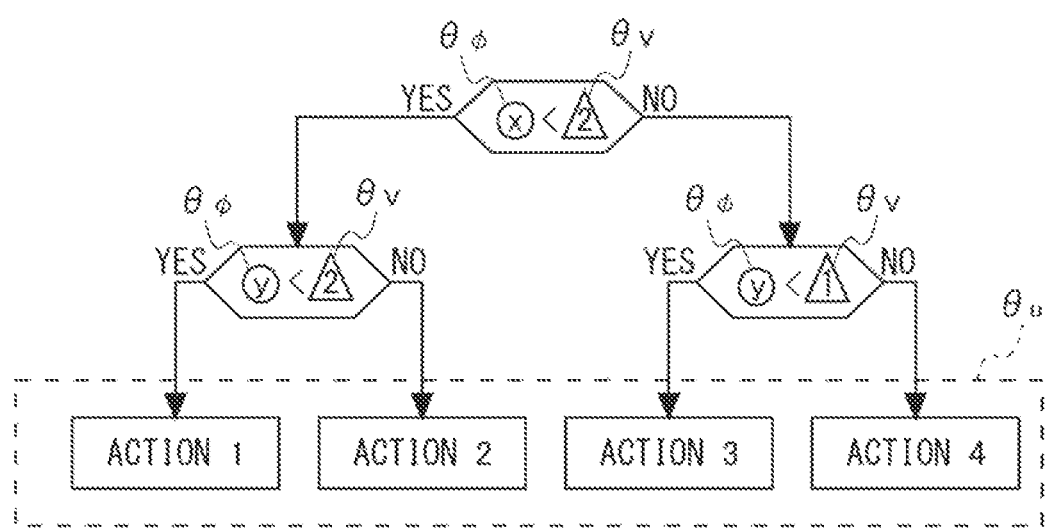
FIG. 10 is a diagram conceptually showing parameters included in the policy according to the first example embodiment.

Referring next to FIGS. 8, 9, and 10, processing for calculating the policies (S102 in FIG. 2) will be described. FIG. 8 is a flowchart showing a flow of processing in the policy creation unit 102 according to the first example embodiment. FIG. 9 is a diagram conceptually showing the initial state of the policy according to the first example embodiment. FIG. 10 is a diagram conceptually showing parameters included in the policy according to the first example embodiment.

The policy creation unit 102 receives the initial state of the policy as illustrated in FIG. 9. The initial state of the policy includes the number of actions to be taken regarding the target 170 (illustrated by rectangles, actions 211 to 214) and the number of conditions for determining whether or not to execute each action (illustrated by hexagons, conditions 201 to 203). In this example, the number of actions is four and the number of conditions is three. In other words, the policy creation unit 102 receives the number of actions to be taken regarding the target 170 and the number of conditions for determining whether or not to execute each action. When the number of actions is expressed by $2^D$ (where D is a natural number), in a policy having the tree structure illustrated in FIG. 4, the number of conditions can be expressed as $(2^D-1)$. In this case, the policy includes $2^D$ rules. As illustrated in FIG. 9, in the initial state of the policy, conditions and actions have not been determined. Further, in the policy having the tree structure illustrated in FIG. 4, D is equal to the depth of the tree. Further, in the policy having the tree structure illustrated in FIG. 4, as described above, the "actions" correspond to the leaf nodes and the "conditions" correspond to the non-terminal nodes. In this manner, by expressing a policy by a tree structure having a predetermined structure (the number of nodes), a policy with high visibility can be efficiently created.

Further, the policy creation unit 102 creates a policy illustrated in FIG. 10 as a result of performing the processing illustrated in FIG. 8. In FIG. 10, "action 1" is calculated for the action 211 in FIG. 9, "action 2" is calculated for the action 212, "action 3" is calculated for the action 213, and "action 4" is calculated for the action 214. Further, in the condition 201 in FIG. 9, it is calculated whether "x<2" is satisfied, in the condition 202 in FIG. 9, it is calculated whether "y<2" is satisfied, and in the condition 203 in FIG. 9, it is calculated whether "y<1" is satisfied. Note that the "states (next states)" achieved when certain conditions are met may be defined for the respective actions 1 to 4. In this case, the action from the current state (first state) to the next state (second state) may be unique or may be arbitrary. When the action from the current state (first state) to the next state (second state) is unique, next states may be defined in the respective leaf nodes in place of the actions 211-214.

For the sake of convenience of description, as policy parameters indicating a policy, parameters indicating actions (states) are denoted by $\theta_u$, parameters indicating feature amounts in conditions are denoted by $\theta_\varphi$ and parameters indicating determination criteria regarding the feature amounts in the conditions are denoted by $\theta_v$. The policy creation unit 102 refers to the parameters $\theta_\varphi$, $\theta_v$, and $\theta_u$ in turn in accordance with the processing shown in FIG. 8 that will be described later and determines the conditions and the action (state) in the policy. In the example shown in FIG. 10, the policy creation unit 102 determines the feature amounts in the conditions from the values of the parameters $\theta_\varphi$ (surrounded by circles in FIG. 10). Next, the policy creation unit 102 determines determination criteria (i.e., thresholds) regarding the feature amounts from the values of the parameters $\theta_v$ (surrounded by triangles in FIG. 10). Next, the policy creation unit 102 determines the action (state) from the values of the parameters $\theta_u$ (surrounded by a broken rectangle in FIG. 10).

Likewise, the policy illustrated in FIG. 5 may be expressed using the parameters $\theta_\varphi$ indicating feature amounts in conditions, the parameters $\theta_v$ indicating determination criteria regarding the feature amounts, and the parameters $\theta_u$ indicating the actions (states). That is, in the example shown in FIG. 5, the policy creation unit 102 determines the feature amounts in the conditions from the values of the parameters $\theta_\varphi$ (surrounded by ellipses in FIG. 5). Next, the policy creation unit 102 determines the determination criteria (i.e., thresholds) regarding the feature amounts from the values of the parameters $\theta_v$ (surrounded by triangles in FIG. 5). Next, the policy creation unit 102 determines the action from the values of the parameters $\theta_u$ (surrounded by a broken rectangle in FIG. 5).

Incidentally, the policy creation unit 102 provides values of the policy parameters (the parameters $\theta_\varphi$, $\theta_v$, and $\theta_u$) in accordance with one distribution (e.g., probability distribution) in processing of S111, S112, and S113 that will be described later. The distribution that the policy parameters follow may be, for example, a Gaussian distribution. Alternatively, the distribution that the policy parameters follow may not be necessarily a Gaussian distribution and may instead be other distributions such as a uniform distribution, a binomial distribution, or a multinomial distribution. Further, the distributions regarding the respective policy parameters may not be the same distribution and may be distributions different from one another for each policy parameter. For example, the distribution the parameter $\theta_\varphi$ follows and the distribution the parameter $\theta_v$ follows may be different from each other. Alternatively, the distributions regarding the respective policy parameters may be distributions whose mean values and standard deviations are different from each other. That is, the distribution is not limited to the above-described examples. It is assumed, in the following description, that each policy parameter follows a Gaussian distribution.

Next, processing of calculating the values of the respective policy parameters in accordance with one distribution will be described. For the sake of convenience of description, it is assumed that the distribution regarding one policy parameter is a Gaussian distribution with mean $\mu$ and standard deviation $\sigma$, where $\mu$ denotes a real number and $\sigma$ denotes a positive real number. Further, $\mu$ and $\sigma$ may be different for each policy parameter or may be the same. The policy creation unit 102 calculates values of the policy parameters (policy parameter values) in accordance with the Gaussian distribution in the processing of S111, S112, and S113 that will be described later. The policy creation unit 102 randomly creates, for example, a set of policy parameter values (parameters $\theta_\varphi$, $\theta_v$, and $\theta_u$) in accordance with the above Gaussian distribution. The policy creation unit 102 calculates, for example, the policy parameter values, using random numbers or pseudo random numbers using a random number seed, in such a way that the policy parameter values follow the Gaussian distribution. In other words, the policy creation unit 102 calculates the random numbers that follow the Gaussian distribution as values of the policy parameters. As described above, by expressing the policy by the policy parameters that follow a predetermined distribution and determining the rule (conditions and actions) in the policy by calculating the respective policy parameters in accordance with the distribution, the policy can be expressed more efficiently.

Each process of the flowchart in FIG. 8 will be described. First, the policy creation unit 102 calculates feature amounts in each condition (Step S111 in FIG. 8). This processing will be described. For the sake of convenience of description, it is assumed that F kinds of observation values (feature amounts) are observed regarding the target 170 (where F is a natural number). That is, there are F kinds of candidates for the feature amounts for one condition.

The policy creation unit 102 determines, for example, the feature amounts in the order of tracing the tree structure in the breadth-first order. It is assumed here that the parameter $\theta_\phi$ indicating the feature amount in a condition includes (the number of conditions×F) values. In the example of the policy having the tree structure as shown in FIG. 9, "the number of conditions" is the number of non-terminal nodes $(2^D-1)$. Therefore, as shown in the following Expression 1, the parameter $\theta_\phi$ can be expressed in a form of a matrix with $(2^D-1)$ rows and F columns.

$$\theta_\phi = \begin{bmatrix} \theta_\phi^{(1,1)} & \cdots & \theta_\phi^{(1,f)} & \cdots & \theta_\phi^{(1,F)} \\ \vdots & \ddots & \vdots & \ddots & \vdots \\ \theta_\phi^{(n,1)} & \cdots & \theta_\phi^{(n,f)} & \cdots & \theta_\phi^{(n,F)} \\ \vdots & \ddots & \vdots & \ddots & \vdots \\ \theta_\phi^{(2^D-1,1)} & \cdots & \theta_\phi^{(2^D-1,f)} & \cdots & \theta_\phi^{(2^D-1,F)} \end{bmatrix}$$ (Expression 1)

Each row of the matrix in the above Expression 1 corresponds to the condition (non-terminal node) and each column corresponds to the kind of the feature amount. Therefore, when a policy is created under a condition of F=5 kinds of feature amounts in the example of the tree structure shown in FIG. 9, the above Expression 1 becomes a matrix with three rows and five columns. Further, as described above, the policy creation unit 102 calculates the values of (the number of conditions×F) parameters $\theta_\phi$ so that they each follow a distribution such as a Gaussian distribution (probability distribution). The policy creation unit 102 may calculate each of (the number of conditions×F) parameters $\theta_\phi$ so that they follow Gaussian distributions different from one another (i.e., Gaussian distributions in which at least one of mean values and standard deviations is different from one another). Therefore, for example, in the above Expression 1, the distribution that the parameter $\theta_\phi^{(n,f)}$ follows may be different from the distribution that the parameter $\theta_\phi^{(n,F)}$ follows.

The policy creation unit 102 checks, when it determines the feature amount regarding one condition, F parameters that correspond to one condition from the parameters $\theta_\phi$. The policy creation unit 102 then determines the feature amount that corresponds to the parameter $\theta_\phi$ from among the values of F parameters $\theta_\phi$ that correspond to the above condition in accordance with a certain rule, e.g., a rule that the largest value is selected. When, for example, the value of $\theta_\phi^{(1,2)}$ is the largest among the parameters $\theta_\phi^{(1,1)}-\theta_\phi^{(1,F)}$ of the condition 1 (condition 201) in the above Expression 1, the policy creation unit 102 determines the feature amount that corresponds to $\theta_\phi^{(1,2)}$ as a feature amount in the condition 1 (condition 201).

Note that the policy creation unit 102 may select, for example, the feature amount from among the ones with large values (e.g., top 5%, 10% etc.) of parameters $\theta_\phi$ indicating the feature amounts from among F kinds of feature amounts. By executing the above processing, a feature amount including a large amount of information can be selected. Therefore, a criterion for efficiently determining the state of the target 170 can be created.

Next, the policy creation unit 102 calculates a threshold indicating the determination criterion regarding the feature amount determined regarding each condition (Step S112 in FIG. 8). The policy creation unit 102 calculates the value $\theta_v$ that follows a distribution such as a Gaussian distribution (probability distribution). When a policy having the tree structure as shown in FIG. 9 is created, the parameter $\theta_v$ is expressed in a form of a matrix of one row and $(2^D-1)$ columns, the matrix including, as a component, a parameter $\theta_v^{(n)}$ for determining the determination criterion regarding a condition n as shown in the following Expression 2.

$$\theta_v = [\theta_v^{(1)}, \ldots, \theta_v^{(n)}, \ldots, \theta_v^{(2^D-1)}]$$ (Expression 2)

When a policy is created in the example of the tree structure in FIG. 9, the above Expression 2 is indicated by a matrix of one row and three columns. The policy creation unit 102 may calculate each of $(2^D-1)$ parameters $\theta_v$ so that they follow Gaussian distributions different from one another (i.e., Gaussian distributions in which at least one of mean values and standard deviations is different from one another). Therefore, for example, in the above Expression 2, the distribution that the parameter $\theta_v^{(n)}$ follows may be different from the distribution that the parameter $\theta_v^{(1)}$ follows.

The policy creation unit 102 calculates the determination criterion regarding the feature amount by executing the processing as shown in the following Expression 3 on the calculated value $\theta_v$.

$$(\text{Threshold}) = (V_{max} - V_{min}) \times g(\theta_v) \pm V_{min}$$ (Expression 3)

The symbol $V_{min}$ denotes the minimum value of the values observed regarding the feature amount. The symbol $V_{max}$ denotes the maximum value of the values observed regarding the feature amount. The symbol g(x), which is a function that gives a value from 0 to 1 for a real number x, denotes a function that monotonically changes. The symbol g(x), which is also called an activation function, is implemented, for example, by a sigmoid function.

Accordingly, the policy creation unit 102 calculates the value of the parameter $\theta_v$ in accordance with a distribution such as a Gaussian distribution. Then, as shown in Expression 3, the policy creation unit 102 calculates the determination criterion (threshold) regarding the feature amount from a range of observation values regarding the feature amount (in this example, a range from $V_{min}$ to $V_{max}$) using the value of the parameter $\theta_v$.

Next, the policy creation unit 102 determines signs of inequality when the feature amount is determined. The policy creation unit 102 may determine, for example, the directions of the signs of inequality randomly, in a certain direction, or in accordance with a predetermined procedure (e.g., alternately). As a result of the above processing, the policy creation unit 102 calculates the determination criterion regarding the feature amount in each condition. As a result of the execution of the above processing, even in a case in which the situation under which an action regarding the target 170 is taken is not clear, the policy creation unit 102 is able to efficiently search for the threshold included in the determination criterion for determining the state of the target 170. The policy creation unit 102 executes the above processing regarding the feature amounts included in the conditions 201 to 203 (illustrated in FIG. 9).

Next, the policy creation unit 102 calculates the action (state) for each condition (rule) (Step S113). In some cases actions are indicated by continuous values, while in the other cases the actions are indicated by discrete values. When actions are indicated by continuous values, the values indicating the actions may be control values of the target 170. When, for example, the target 170 is the inverted pendulum shown in FIG. 3, the values may be torque values or angles of the pendulum. On the other hand, when the actions are indicated by discrete values, the values indicating the actions may be values that correspond to the kinds of the actions ("push", "turn", and "pull" in FIG. 4).

First, processing when the actions (states) are indicated by continuous values will be described. The policy creation unit 102 calculates, regarding one action (one of the actions 211 to 214 in FIG. 9), a value $\theta_u$ that follows a distribution such as a Gaussian distribution (probability distribution). When a policy having the tree structure as shown in FIG. 9 is created, the parameter $\theta_u$ may be expressed in a form of a matrix with one row and ($2^D$) columns, the matrix including, as a component, a parameter $\theta_u^{(1)}$ for determining the action regarding the leaf node 1 ($1=1\sim2^D$) as shown in the following Expression 4.

$$\theta_u = [\theta_u^{(1)}, \ldots, \theta_u^{(l)}, \ldots, \theta_u^{(2^D)}] \quad \text{(Expression 4)}$$

When the policy is created in the example of the tree structure shown in FIG. 9, the above Expression 4 is a matrix with one row and four columns. The policy creation unit 102 may calculate $2^D$ parameters $\theta_u$ so that these parameters follow respective Gaussian distributions different from one another (i.e., Gaussian distributions in which at least one of mean values and standard deviations is different from one another). Therefore, in the above Expression 4, for example, the distribution that the parameter $\theta_{vu}^{(1)}$ follows may be different from the distribution that the parameter $\theta_u^{(1)}$ follows.

The policy creation unit 102 calculates the action value indicating the action regarding one condition (rule) by executing the processing shown in the following Expression 5 on the calculated value $\theta_u$.

$$\text{(Action value)} = (U_{max} - U_{min}) \times h(\theta_u) + U_{min} \quad \text{(Expression 5)}$$

The symbol $U_{min}$ indicates the minimum value of values indicating one action (state). The symbol $U_{max}$ indicates the maximum value of values indicating one action (state). The symbols $U_{min}$ and $U_{max}$ may be, for example, determined in advance by the user. The symbol $h(x)$, which is a function that gives a value from 0 to 1 for a real number x, indicates a function that monotonically changes. The symbol $h(x)$, which is also called an activation function, may be implemented by a sigmoid function.

Therefore, the policy creation unit 102 calculates the value of the parameter $\theta_u$ in accordance with a distribution such as a Gaussian distribution. Then as shown by Expression 5, the policy creation unit 102 calculates one action value indicating the action in a certain rule from a range of observation values (in this example, a range from $U_{min}$ to $U_{max}$) using the value of the parameter $\theta_u$. The policy creation unit 102 executes the above processing regarding each of the actions included in the actions 211 to 214 (illustrated in FIG. 9).

Note that the policy creation unit 102 may not use a predetermined value for "$U_{max}-U_{min}$" in the above Expression 5. The policy creation unit 102 may determine the maximum action value to be $U_{max}$ and determine the minimum action value to be $U_{min}$ from the history of action values regarding the action. Alternatively, when the leaf nodes are each defined by a "state", the policy creation unit 102 may determine a range of values (state values) indicating the next state in the rule from the maximum value and the minimum value in the history of observation values indicating each state. According to the above processing, the policy creation unit 102 may efficiently determine the action included in the rule for determining the state of the target 170.

Next, processing when the actions (states) are indicated by discrete values will be described. It is assumed, for the sake of convenience of description, that there are A kinds of actions (states) regarding the target 170 (where A is a natural number). That is, it means that there are A kinds of action candidates for a certain rule. The policy creation unit 102 determines, for example, the actions (states) in order from the left end of the leaf nodes (actions 211-214 in FIG. 9). It is assumed that the parameter $\theta_u$ indicating the action (state) has (the number of leaf nodes×A) values. Therefore, the parameter $\theta_u$ can be expressed in a form of a matrix with $2^D$ rows and A columns as shown in the following Expression 6.

$$\theta_u = \begin{bmatrix} \theta_u^{(1,1)} & \ldots & \theta_u^{(1,k)} & \ldots & \theta_u^{(1,|A|)} \\ \vdots & \ddots & \vdots & \ddots & \vdots \\ \theta_u^{(l,1)} & \ldots & \theta_u^{(l,k)} & \ldots & \theta_u^{(l,|A|)} \\ \vdots & \ddots & \vdots & \ddots & \vdots \\ \theta_u^{(2^D,1)} & \ldots & \theta_u^{(2^D,k)} & \ldots & \theta_u^{(2^D,|A|)} \end{bmatrix} \quad \text{(Expression 6)}$$

Note that each row of the matrix in the above Expression 6 corresponds to the leaf node (terminal node) and each column corresponds to the kind of the action. Therefore, when a policy of A=3 kinds of actions is created in the example of the tree structure shown in FIG. 9, the above Expression 6 is indicated by a matrix with four rows and three columns. Further, as described above, the policy creation unit 102 calculates the values of (the number of leaf nodes×A) parameters $\theta_u$ so that they each follow a distribution such as a Gaussian distribution (probability distribution). The policy creation unit 102 may calculate each of (the number of leaf nodes×A) parameters $\theta_u$ so that they respectively follow Gaussian distributions different from one another (i.e., Gaussian distributions in which at least one of mean values and standard deviations is different from one another). Therefore, in the above Expression 6, for example, the distribution that the parameter $\theta_u^{(1,k)}$ follows may be different from the distribution that the parameter $\theta_\varphi^{(1,A)}$ follows.

The policy creation unit 102 checks A parameters that correspond to one leaf node from the parameters $\theta_u$ when the action (condition) in one leaf node is determined. Then the policy creation unit 102 determines the action (state) that corresponds to a certain rule, e.g., a rule that the largest value is selected, from among the parameter values that correspond to this action (state). When, for example, the value of $\theta_u^{(1,2)}$ is the largest in the parameters $\theta_u^{(1,1)}-\theta_u^{(1,A)}$ of the leaf node #1 (action 211) in the above Expression 6, the policy creation unit 102 determines the action that corresponds to $\theta_u^{(1,2)}$ as the action in the leaf node #1 (action 211).

As a result of the processing in Steps S111 to S113 shown in FIG. 8, the policy creation unit 102 creates one policy. The policy creation unit 102 creates a plurality of policies by repeatedly executing this processing. In each of the policies created by the processing in Steps S111 to S113, the parameters $\theta_\varphi$ and $\theta_v$ are set for each of the non-terminal nodes. Likewise, for each of the policies that have been created, the parameter $\theta_u$ is set for each of the leaf nodes. Therefore, each policy may be defined by a set of policy parameters (a combination of parameters $\theta_\varphi$, $\theta_v$, and $\theta_u$). That is, each policy may be defined using Expressions 1, 2, and 4 or Expressions 1, 2, and 6. Since the policy parameters are randomly calculated in accordance with a distribution such as a Gaussian distribution (probability distribution), in each of a plurality of policies, values of the policy parameters may vary. Therefore, a plurality of different policies may be created. When it is assumed here that a set of policy parameters is denoted by $\theta$ and the number of policies to be created is denoted by b (b is an integer equal to or larger than two), the policy creation unit 102 creates a plurality of respective policies that correspond to $\theta_1$–$\theta_b$.

Figure 11:
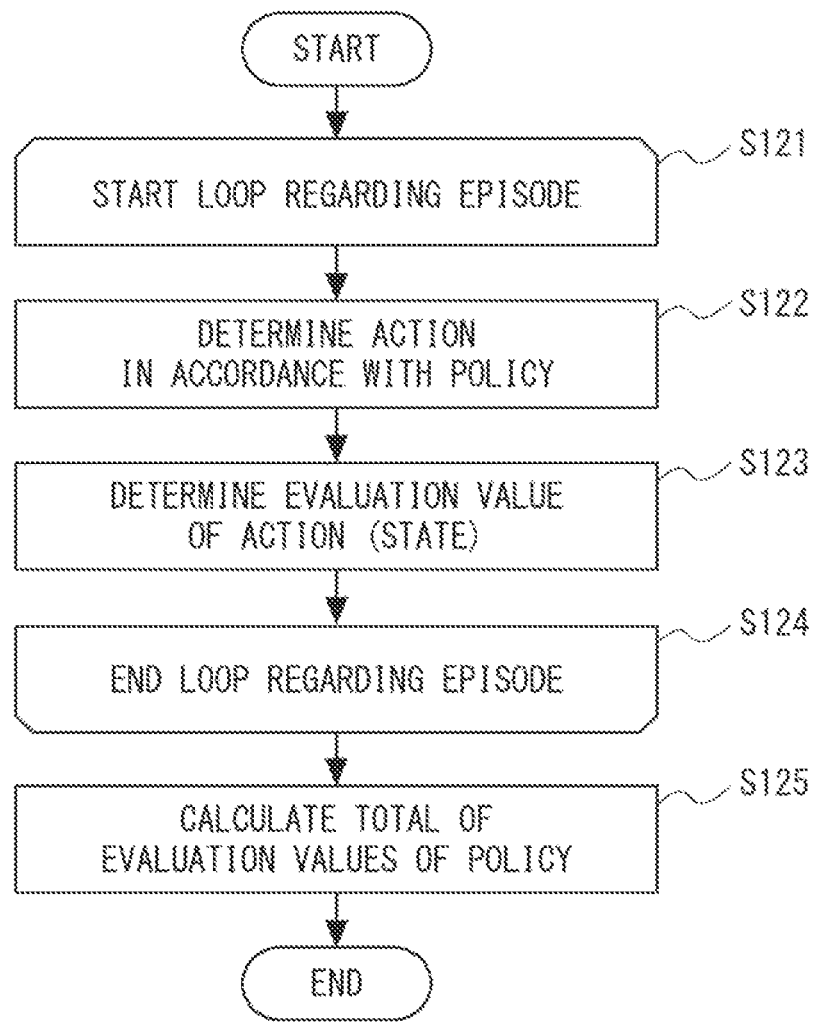
FIG. 11 is a flowchart showing a flow of processing in a policy evaluation unit according to the first example embodiment.

Referring next to FIG. 11, the processing in which the policy evaluation unit 104 evaluates the qualities of the policies (S103 in FIG. 2) will be described. FIG. 11 is a flowchart showing a flow of processing in the policy evaluation unit 104 according to the first example embodiment. The processing shown in the flowchart in FIG. 11 is executed for each of the plurality of policies that have been created.

The action determination unit 103 acquires observation values (state values) observed regarding the target 170. The action determination unit 103 then determines an action in this state for the acquired observation values (state values) in accordance with one of the policies created by the processing shown in FIG. 8 (Step S122). Next, the action evaluation unit 108 determines the evaluation value of the action by receiving evaluation information indicating the evaluation value regarding the action determined by the action determination unit 103 (Step S123). The action evaluation unit 108 may determine the evaluation value of the action by creating the evaluation value regarding the action in accordance with the difference between a desired state and a state that is caused by this action. In this case, the action evaluation unit 108 creates, for example, an evaluation value indicating that the quality regarding the action becomes lower as this difference becomes larger and the quality regarding the action becomes higher as this difference becomes smaller. Then the action evaluation unit 108 determines, regarding an episode including a plurality of states, the qualities of the actions that achieve the respective states (the loop shown in Steps S121 to S124).

Next, the comprehensive evaluation unit 109 calculates the total value of the evaluation values regarding each of the actions. Specifically, the comprehensive evaluation unit 109 calculates the evaluation value regarding this policy by calculating the total value for a series of actions determined in accordance with this policy (Step S125). Accordingly, the comprehensive evaluation unit 109 calculates the evaluation value regarding the policy for one episode. The comprehensive evaluation unit 109 may create evaluation information in which the evaluation value calculated regarding the policy (i.e., quality of the policy) is associated with the identifier indicating this policy and store the created policy evaluation information in the policy evaluation information storage unit 107.

Note that the policy evaluation unit 104 may calculate the evaluation value of the policy by executing the processing illustrated in FIG. 11 for each of the plurality of episodes and calculating the average value thereof. Further, the action determination unit 103 may first determine the action that achieves the next state. Specifically, the action determination unit 103 may first obtain all the actions included in the episode in accordance with the policy and the action evaluation unit 108 may execute processing for determining the evaluation value of a state included in this episode.

With reference to a specific example, the processing shown in FIG. 11 will be described. It is assumed that one episode is composed of 200 steps (i.e., 201 states) for the sake of convenience of the description. It is further assumed that, for each step, the evaluation value is (+1) when the action in the state of each step is fine and the evaluation value is (−1) when the action in the state of each step is not fine. In this case, when an action has been determined in accordance with a policy, the evaluation value regarding this policy is a value from −200 to 200. Whether or not the action is fine may be determined, for example, based on the difference between a desired state and the state reached by the action. That is, it may be determined that the action is fine when the difference between the desired state and the state reached by the action is equal to or smaller than a predetermined threshold.

The action determination unit 103 determines an action that corresponds to a state in accordance with one policy, which is the evaluation target. The controller 151 executes the determined action. Next, the action evaluation unit 108 calculates the evaluation value regarding the action determined by the action determination unit 103. The action evaluation unit 108 calculates, for example, the evaluation value (+1) when the action is fine and the evaluation value (−1) when it is not fine. The action evaluation unit 108 calculates the evaluation value for each action in one episode that includes 200 steps.

In the policy evaluation unit 104, the comprehensive evaluation unit 109 calculates the evaluation value regarding the one policy by calculating the total value of the evaluation values calculated for the respective steps. It is assumed, for example, the policy evaluation unit 104 has calculated the evaluation values as follows regarding the policies 1 to 4.

policy 1: 200
policy 2: −200
policy 3: −40
policy 4: 100

In this case, when, for example, the policy selection unit 105 selects two of the four policies whose evaluation values calculated by the policy evaluation unit 104 are within top 50%, the policy selection unit 105 selects the policies 1 and 4 whose evaluation values are larger than those of the others. That is, the policy selection unit 105 selects high-quality policies from among a plurality of policies (S104 in FIG. 2).

The distribution update unit 106 calculates, regarding each of the policy parameters included in the high-quality policies selected by the policy selection unit 105, the mean of the parameter values and standard deviation thereof. The distribution update unit 106 thereby updates a distribution such as a Gaussian distribution (probability distribution) that each policy parameter follows (S105 in FIG. 2). Then the processing shown in FIG. 2 is performed again using the updated distribution. That is, the policy creation unit 102 executes the processing shown in FIG. 8 using the updated distribution and creates a plurality of (b) policies again. Then the action determination unit 103 determines, for each of the plurality of policies that have been created again, the action in accordance with the policy and the policy evaluation unit 104 determines, for each of the plurality of policies that have been created again, the evaluation value.

As described above, since the distribution is updated using high-quality policies, the average value μ in the distribution that the policy parameters follow may approach a value that may achieve policies with higher qualities. Further, the standard deviation σ in the distribution that the policy parameters follow may become smaller. Therefore, the width of the distribution may become narrower as the number of times of update increases. Accordingly, the policy creation unit 102 is more likely to calculate policy parameters that express policies with higher evaluation values (higher qualities) by using the updated distribution. In other words, the policy creation unit 102 calculates the policy parameters using the updated distribution, which increases the probability that high-quality policies will be created. Therefore, by repeating the processing as shown in FIG. 2, the evaluation values of the policies may be improved. Then, by repeating the above processing a predetermined number of times, for example, the policy whose evaluation value becomes the largest may be determined as a policy regarding the target 170 among the plurality of obtained policies. Accordingly, high-quality policies may be obtained.

Note that the action determination unit 103 may specify the identifier indicating the policy having the largest evaluation value (i.e., the highest quality) from the policy evaluation information stored in the policy evaluation information storage unit 107 and determine the action in accordance with the policy indicated by the specified identifier. That is, when creating a plurality of policies again, the policy creation unit 102 may create, for example, (b-1) policies using the updated distribution and extract, as the remaining one policy, a policy whose evaluation value is the largest among the policies created in the past. Then the action determination unit 103 may determine actions for (b-1) policies created using the updated distribution and the policy whose evaluation value is the largest among the polices created in the past. According to the above processing, when a policy whose evaluation value has been previously high is still evaluated relatively highly even after the distribution is updated, this policy can be appropriately selected. Therefore, it becomes possible to create high-quality policies more efficiently.

In the example of the inverted pendulum illustrated in FIG. 3, the determination regarding whether or not an action is fine is performed based on the difference between the state caused by the action and the state VI in which the pendulum is inverted. When it is assumed, for example, that the state caused by the state is a state III, it is determined whether or not the action is fine based on the angle formed by the direction of the pendulum in the state VI and the direction of the pendulum in the state III.

Further, in the aforementioned examples, the policy evaluation unit 104 evaluates each policy based on each of the states included in an episode. Instead, this policy may be evaluated by predicting a state that may reach in the future by execution of an action and calculating the difference between the predicted state and a desired state. In other words, the policy evaluation unit 104 may evaluate the policy based on the estimated value (or the expected value) of the evaluation value regarding the state determined by executing the action. Further, the policy evaluation unit 104 may calculate, regarding one policy, evaluation values of a policy regarding each episode by iteratively executing the processing shown in FIG. 11 using a plurality of episodes and calculate the average value (median value etc.) thereof. That is, the processing executed by the policy evaluation unit 104 is not limited to the aforementioned examples.

Next, effects (i.e., technical advantages) regarding the policy creation apparatus 101 according to the first example embodiment will be described. With the policy creation apparatus 101 according to the first example embodiment, policies with high quality and high visibility can be created. The reason therefor is that the policy creation apparatus 101 creates policies each including a predetermined number of rules so that these policies conform to the target 170.

Figure 12:
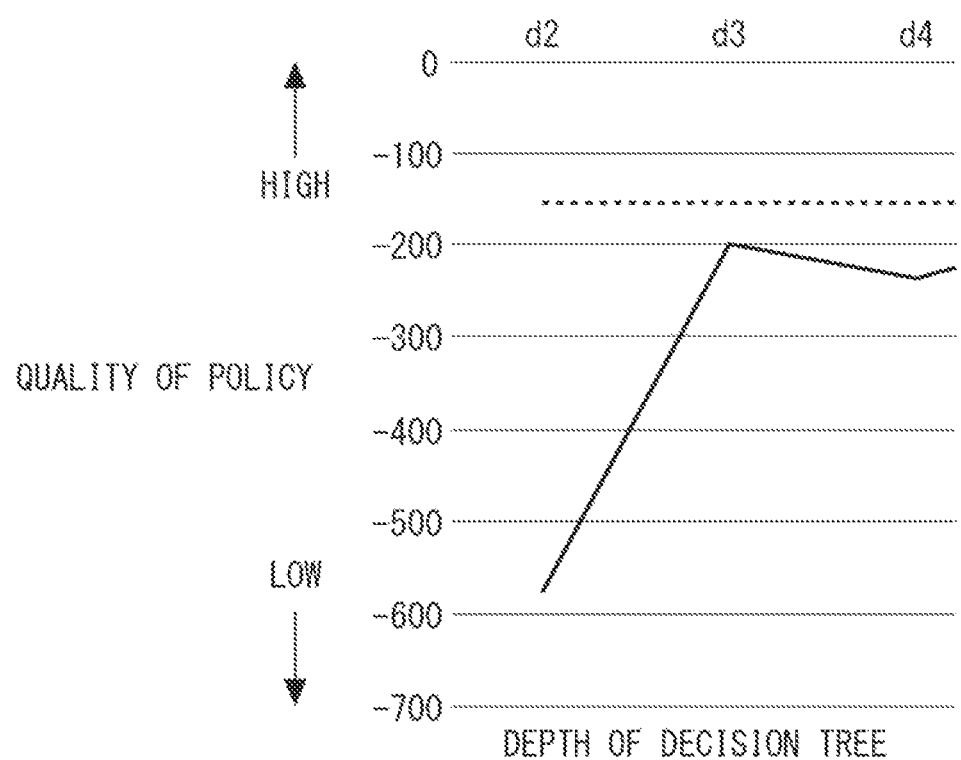
FIG. 12 is a diagram showing results of evaluating the quality of a policy in a case in which an inverted pendulum is used as an example in the first example embodiment.
Figure 13:
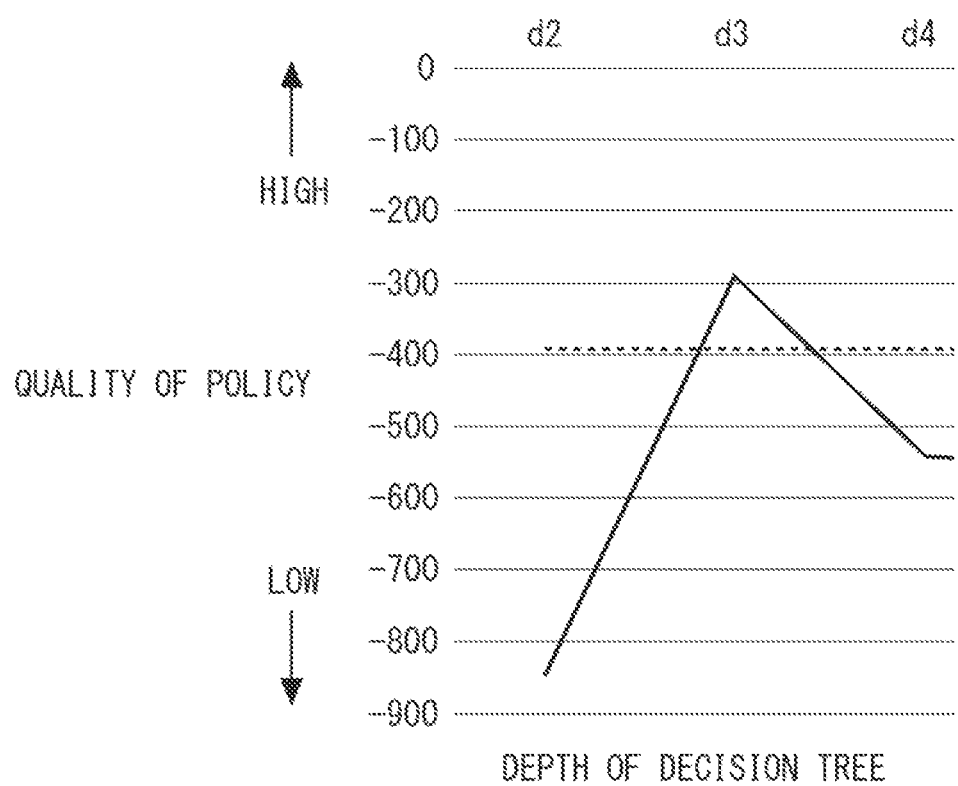
FIG. 13 is a diagram showing results of evaluating the quality of a policy in a case in which an inverted pendulum is used as an example in the first example embodiment.

Referring to FIGS. 12 and 13, a reason that the policy creation apparatus 101 according to the first example embodiment achieves the effect of high quality among the above-described effects will be described first. FIGS. 12 and 13 are diagrams each showing results of evaluating a quality of a policy in a case in which the inverted pendulum (illustrated in FIG. 3) is used as an example in the first example embodiment.

The horizontal axis in each of FIGS. 12 and 13 indicates the depth of the decision tree indicating the policy in FIG. 4, indicating that the decision tree is deeper toward the right side. The vertical axis in each of FIGS. 12 and 13 indicates the quality of the policy, indicating that the quality is higher toward the upper side and the quality is lower toward the lower side. The dotted line indicates the highest quality reached when a policy is created using a neural network. The polygonal line indicates the quality of the policy that the policy creation apparatus 101 according to this example embodiment has created in each depth of the decision tree. FIG. 12 indicates the quality of the policy for training data. FIG. 13 indicates the quality of the policy for test data.

When the dotted line is compared with the polygonal line in FIG. 12, it is shown that the dotted line and the polygonal line have similar qualities in policies whose depths of the decision trees are three or larger. This indicates that the policy creation apparatus 101 according to this example embodiment has created policies whose qualities are about the same as the highest quality that may be attained when the neural network is used in the policies whose depths of the decision trees are three or larger. Likewise, when the dotted line is compared with the polygonal line in FIG. 13, it is shown that the dotted line and the polygonal line have similar qualities in the policies whose depths of the decision trees are three or larger. This indicates that the policy creation apparatus 101 according to this example embodiment has created policies whose qualities are about the same as the highest quality that may be attained when a neural network is used in the policies whose depths of the decision trees are three or larger. Therefore, the policy creation apparatus 101 is able to create policies whose qualities are about the same as the highest quality that may be attained when the neural network is used in the policies whose depths of the decision trees are three or larger in both the cases of training data and test data.

Figure 14:
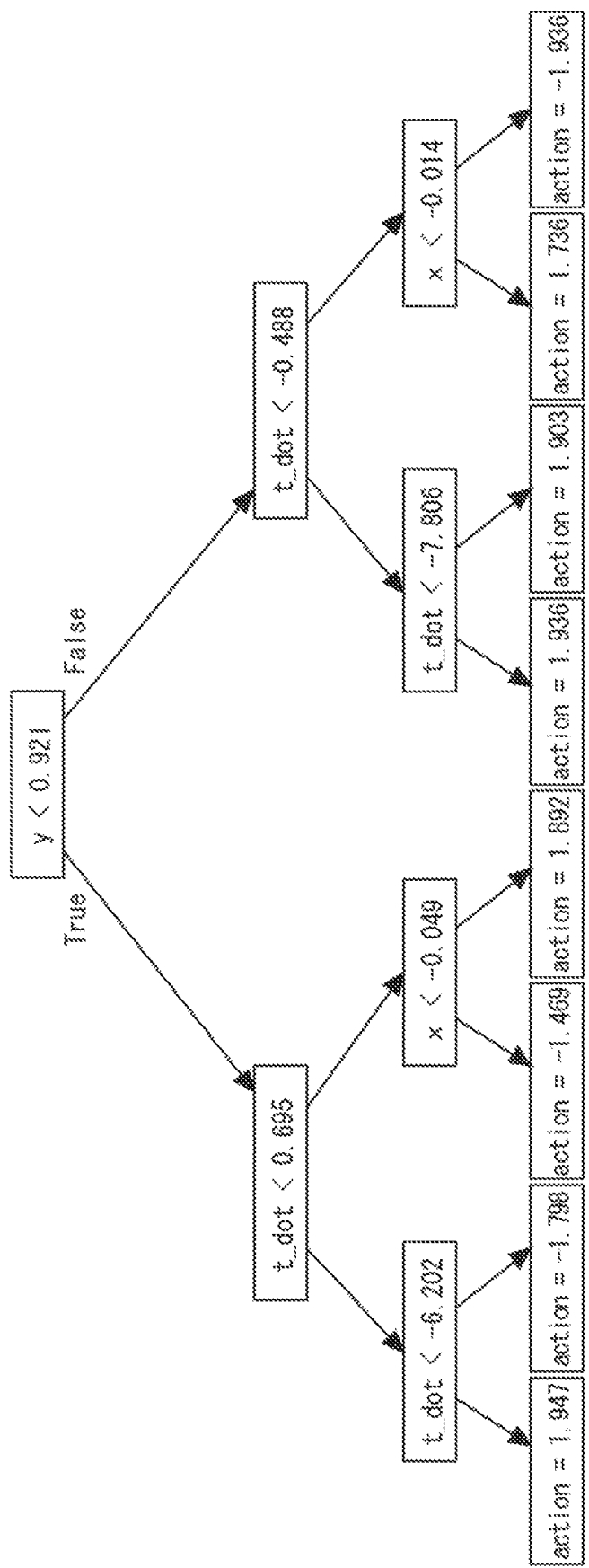
FIG. 14 is a diagram conceptually showing a policy created by the policy creation apparatus according to the first example embodiment in a case in which an inverted pendulum is used as an example.

Referring next to FIG. 14, a reason that the policy creation apparatus 101 according to the first example embodiment achieves the effect of creating policies with high visibility among the above-described effects will be described. FIG. 14 is a diagram conceptually showing a policy created by the policy creation apparatus 101 according to the first example embodiment in a case in which an inverted pendulum is used as an example.

In the case of the example of the inverted pendulum (illustrated in FIG. 3), the policy is expressed by a decision tree with the depth of 3 (D=3) in the example shown in FIG. 14. Therefore, as illustrated in FIG. 14, the policy creation apparatus 101 creates a policy suitable for the target 170 using a policy including 7 ($=2^3-1$) conditions and 8 ($=2^3$) actions. In FIG. 14, since the depth of the decision tree (depth of the hierarchy) is "3", the tree structure of the decision tree is relatively shallow and is thus simple enough for the user to easily understand this structure. Further, in FIG. 14, a parameter indicating the condition and a parameter indicating the action (the next state) are explicitly shown in each node. Therefore, in the policy shown in FIG. 14, determination processing when the action to be taken regarding the target 170 is determined is clearly shown. Therefore, the user is able to easily specify visually, for example, which observation value is responsible for determining the action in accordance with the policy. Therefore, with the policy creation apparatus 101 according to the first example embodiment, policies with high quality and high visibility can be created.

While the processing in the policy creation apparatus 101 has been described using the term "state of the target 170", the state may not necessarily be an actual state of the target 170. The state may be, for example, information indicating the result of calculation performed by a simulator that has simulated the state of the target 170. In this case, the controller 151 may be achieved by the simulator.

Second Example Embodiment

Next, a second example embodiment will be described.

Figure 15:
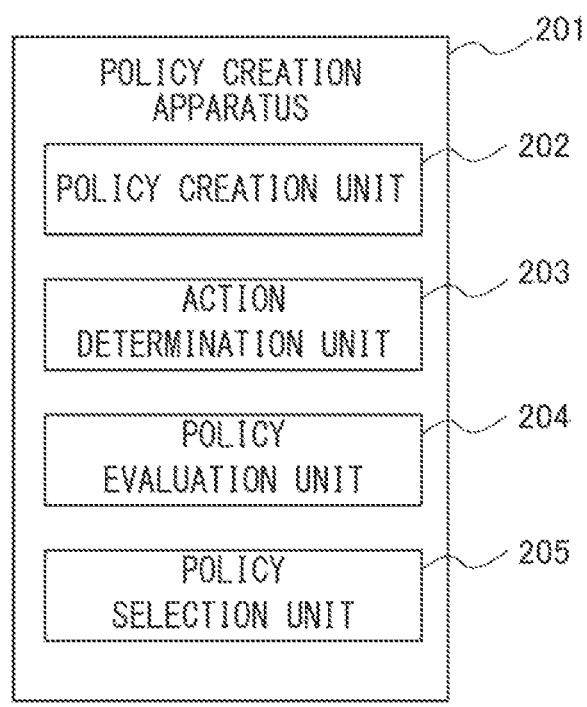
FIG. 15 is a block diagram showing a configuration of a policy creation apparatus according to a second example embodiment.

FIG. 15 is a block diagram showing a configuration of a policy creation apparatus 101 according to the second example embodiment. In the following, with reference to FIG. 15, a configuration included in the policy creation apparatus 201 according to the second example embodiment will be described in detail.

The policy creation apparatus 201 according to the second example embodiment includes a policy creation unit 202, an action determination unit 203, a policy evaluation unit 204, and a policy selection unit 205. The policy creation unit 202 may be achieved by functions similar to those included in the policy creation unit 102 described with reference to FIG. 1 etc. The action determination unit 203 may be achieved by functions similar to those included in the action determination unit 103 described with reference to FIG. 1 etc. The policy evaluation unit 204 may be achieved by functions similar to those included in the policy evaluation unit 104 described with reference to FIG. 1 etc. The policy selection unit 205 may be achieved by functions similar to those included in the policy selection unit 105 described with reference to FIG. 1 etc. Therefore, the policy creation apparatus 201 may be achieved by functions similar to those included in the policy creation apparatus 101 described with reference to FIG. 1 etc. Then the policy creation apparatus 201 creates the policy for determining the action to be taken regarding the target based on the determined quality regarding the action.

Figure 16:
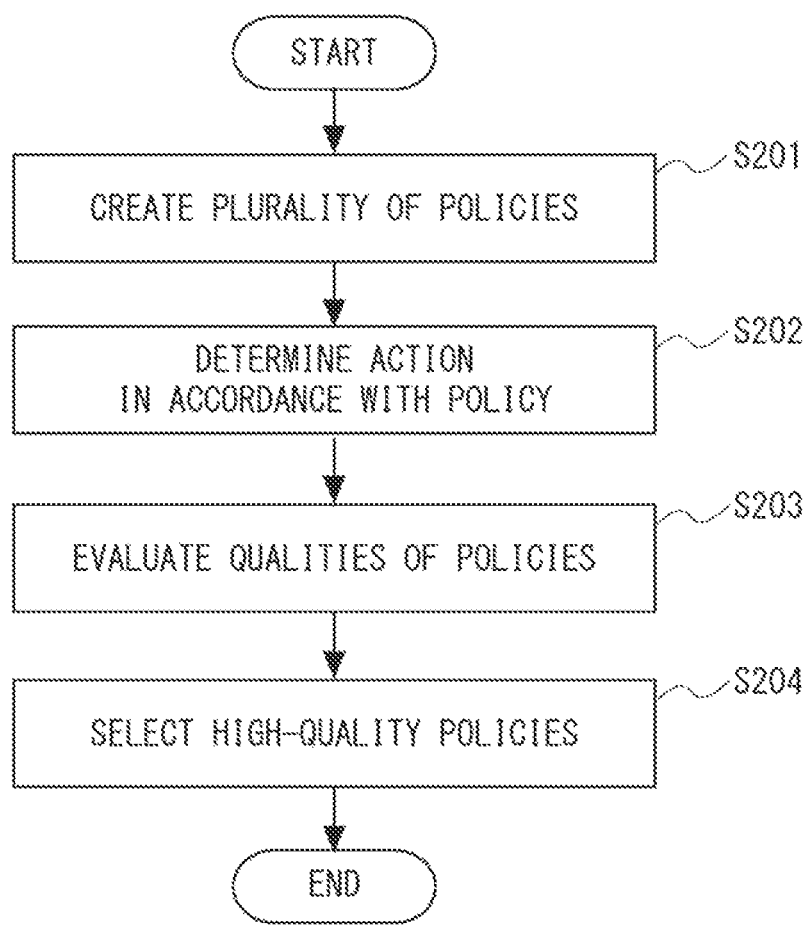
FIG. 16 is a flowchart showing a flow of a policy creation method executed by the policy creation apparatus according to the second example embodiment.

FIG. 16 is a flowchart showing a flow of a policy creation method executed by the policy creation apparatus 201 according to the second example embodiment. Referring to FIG. 16, processing in the policy creation apparatus 201 according to the second example embodiment will be described in detail.

The policy creation unit 202 creates a plurality of policies each including a predetermined number of rules in which a condition for determining a state of an object (i.e., a target) is combined with an action in the state (Step S201). The policy creation unit 202 determines, for example, the condition for determining the state of the target 170 (i.e., the object) and the action in accordance with this condition based on observation values observed regarding the state of the target 170. Alternatively, the policy creation unit 202 may specify, for example, the condition for determining the state of the target 170 (i.e., the object) and the next state that occurs next to the state in accordance with this condition based on the observation values observed regarding the state of the target 170 and determine the action for reaching the specified next state. The policy creation unit 202 creates a rule in which the specified condition is combined with the determined action. Then the policy creation unit 202 creates a plurality of policies each including a predetermined number of rules.

The action determination unit 203 determines, for each of the plurality of policies that have been created by the policy creation unit 202, the action performed while the state of the target 170 (i.e., the object) is changed from the first state to the second state in accordance with a policy (Step S202). The policy evaluation unit 204 determines the quality of the determined action in accordance with the difference between a state between the first state and the second state and a desired state and determines the quality of the policy for each of the plurality of policies based on the determined quality of the action (Step S203). Note that the desired state indicates the state that may be the goal of the target (i.e., the object).

Next, the policy selection unit 205 selects policies that are determined to have high qualities from among the plurality of policies that have been created (Step S204). Specifically, the policy selection unit 205 selects the policy having the highest quality or policies having relatively high qualities (i.e., quality levels are high) from among the plurality of policies. The "policies having high qualities" here may be, for example, policies that are included within the top 5%, 10%, or 15% counting from the highest quality from among the plurality of policies. Further, the "policies having high qualities" may be, for example, top m (m is an integer smaller than b) policies with high quality among b policies.

Next, effects of the policy creation apparatus 201 according to the second example embodiment of the present disclosure will be described. With the policy creation apparatus 201 according to the second example embodiment, policies with high quality and high visibility can be created. The reason therefor is that the policy creation apparatus 201 creates policies each including a predetermined number of rules in such a way that the policies conform to the target (i.e., the object).

Hardware Configuration Example

A configuration example of hardware resources in a case in which the above-described policy creation apparatus according to each of the example embodiments is implemented using one calculation processing device (information processing apparatus, computer) will be described. Note that the policy creation apparatus according to each of the example embodiments may be physically or functionally implemented by using at least two calculation processing devices. Further, the policy creation apparatus according to each of the example embodiments may be implemented as a dedicated apparatus or may be implemented by a general-purpose information processing apparatus.

Figure 17:
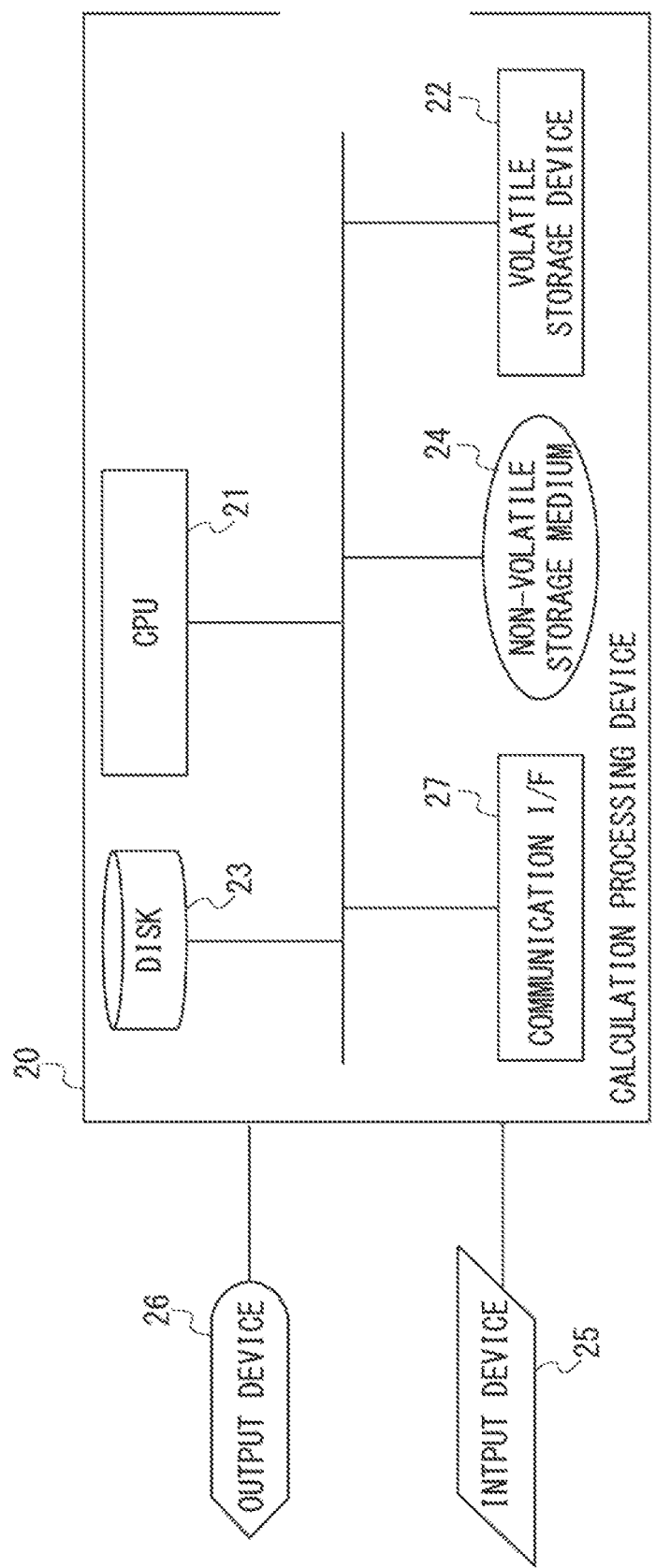
FIG. 17 is a block diagram schematically showing a hardware configuration example of a calculation processing device capable of achieving the policy creation apparatus according to each of the example embodiments.

FIG. 17 is a block diagram schematically showing a hardware configuration example of a calculation processing device capable of achieving the policy creation apparatus according to each of the example embodiments. A calculation processing device 20 includes a Central Processing Unit (CPU) 21, a volatile storage device 22, a disk 23, a non-volatile storage medium 24, and a communication Interface (IF) 27. It can therefore be said that the policy creation apparatus according to each of the example embodiments includes the CPU 21, the volatile storage device 22, the disk 23, the non-volatile storage medium 24, and the communication IF 27. The calculation processing device 20 may be connected to an input device 25 and an output device 26. The calculation processing device 20 may include the input device 25 and the output device 26. Further, the calculation processing device 20 is able to transmit/receive information to/from another calculation processing device and a communication apparatus via the communication IF 27.

The non-volatile storage medium 24 is, for example, a computer-readable Compact Disc or Digital Versatile Disc. Further, the non-volatile storage medium 24 may be a Universal Serial Bus (USB) memory, a Solid State Drive or the like. The non-volatile storage medium 24 allows a related program to be holdable and portable without power supply. The non-volatile storage medium 24 is not limited to the above-described media. Further, a related program may be supplied via the communication IF 27 and a communication network in place of the non-volatile storage medium 24.

The volatile storage device 22, which is a computer-readable device, is able to temporarily store data. The volatile storage device 22 is a memory such as a dynamic random Access memory (DRAM), a static random Access memory (SRAM) or the like.

Specifically, when executing a software program (a computer program: hereinafter simply referred to as "program") stored in the disk 23, the CPU 21 duplicates the program in the volatile storage device 22 and executes arithmetic processing. The CPU 21 reads out data required for executing the program from the volatile storage device 22. When it is required to display the result of the output, the CPU 21 displays it on the output device 26. When the program is input from the outside, the CPU 21 acquires the program from the input device 25. The CPU 21 interprets and executes the policy creation program (FIG. 2, 8, 11, or 16) that corresponds to the functions (processes) of the respective components shown in FIG. 1 or 15 described above. The CPU 21 executes processing described in each of the above-described example embodiments. In other words, the functions of each of the respective components shown in FIG. 1 or 15 described above may be achieved by the CPU 21 executing the policy creation program stored in the disk 23 or the volatile storage device 22.

That is, each of the example embodiments may be achieved also by the above-described policy creation program. Further, it can be understood that each of the example embodiments of the present disclosure can also be achieved with a computer-readable non-volatile storage medium in which the above-described policy creation program is recorded.

Modified Examples

Note that the present disclosure is not limited to the above-described embodiments and may be changed as appropriate without departing from the spirit of the present disclosure. For example, in the aforementioned flowchart, the order of the processes (steps) may be changed as appropriate. Further, one or more of the plurality of processes (steps) may be omitted.

Further, in the above-described example embodiments, for each policy parameter, i.e., for each of the components of the parameters $\theta_\varphi$, $\theta_v$, and $\theta_u$ shown in Expressions 1, 2, 4, and 6, values of the respective policy parameters are calculated in accordance with an independent distribution (probability distribution). That is, the distribution update unit 106 independently calculates, for each of the policy parameters, the mean value and standard deviation for distributions that correspond to the respective policy parameters, thereby updating the distributions. However, the example embodiments are not limited to the above configurations. When policy parameters have a correlation, the distribution may be updated using covariance. In this case, a variance-covariance matrix may be applied to Expressions 1, 2, 4, and 6.

As described above, the policy program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The present disclosure has been described above with reference to the above example embodiments as exemplary examples. However, the present disclosure is not limited to the above-described example embodiments. That is, various aspects that may be understood by those skilled in the art may be applied within the scope of the present disclosure.

The whole or part of the exemplary embodiments disclosed above can be described as, but not limited to, the following supplementary notes.

(Supplementary Note 1)

A policy creation apparatus comprising:

policy creation means for creating a plurality of policies each including a predetermined number of rules in which a condition for determining a state of an object is combined with an action in the state;

action determination means for determining, for each of the plurality of policies that have been created, an action to be performed while a state of the object is changed from a first state to a second state in accordance with the policy;

policy evaluation means for determining, in accordance with a difference between a state between the first state and the second state and a desired state, the quality of the determined action and determining, for each of the plurality of policies, the quality of the policy based on the determined quality of the action; and policy selection means for selecting the policy that is determined to have a high quality from among the plurality of policies that have been created.

(Supplementary Note 2)

The policy creation apparatus according to Supplementary Note 1, wherein the policy is expressed by a policy parameter that follows at least one predetermined distribution, and the policy creation means determines each of the condition and the action in the policy by calculating the value of the policy parameter in accordance with the distribution.

(Supplementary Note 3)

The policy creation apparatus according to Supplementary Note 2, further comprising distribution update means for updating the distribution regarding the policy parameter from the policy parameter selected by the policy selection means, wherein the policy creation means creates the policy by calculating the value of the policy parameter in accordance with the distribution updated by the distribution update means.

(Supplementary Note 4)

The policy creation apparatus according to Supplementary Note 2 or 3 wherein the condition in the rule comprises at least some kinds of feature amounts among a plurality of kinds of feature amounts regarding the object and a determination criterion for determining observation values regarding the feature amounts, and the policy creation means selects the feature amount in the condition based on the policy parameters regarding the feature amounts calculated in accordance with the distribution.

(Supplementary Note 5)

The policy creation apparatus according to Supplementary Note 4, wherein the policy creation means calculates, for each of some kinds of feature amounts, the policy parameter regarding the feature amount and selects the feature amount regarding the policy parameters whose values are high among the calculated policy parameters as the feature amount in the condition.

(Supplementary Note 6)

The policy creation apparatus according to Supplementary Note 4 or 5, wherein the policy creation means calculates the determination criterion regarding the selected feature amount in the condition based on a range of observation values of the feature amount and the policy parameter regarding the determination criterion calculated in accordance with the distribution.

(Supplementary Note 7)

The policy creation apparatus according to any one of Supplementary Notes 2 to 6, wherein the policy creation means calculates the policy parameter regarding the action in the rule in accordance with the distribution and determines the action in the rule based on the calculated policy parameter regarding the action.

(Supplementary Note 8)

The policy creation apparatus according to any one of Supplementary Notes 1 to 7, wherein the policy creation means creates the policy in accordance with a tree structure composed of terminal nodes and non-terminal nodes different from the terminal nodes, the conditions are arranged in the non-terminal nodes in the tree structure, and the actions in accordance with the conditions arranged in the non-terminal nodes leading to the terminal nodes are arranged in the terminal nodes in the tree structure.

(Supplementary Note 9)

The policy creation apparatus according to any one of Supplementary Notes 1 to 8, further comprising policy evaluation information storage means for storing policy evaluation information in which the quality of the policy determined by the policy evaluation means is associated with an identifier indicating the policy, wherein the policy evaluation means stores the policy evaluation information in which the determined quality of the policy is associated with the identifier of the policy in the policy evaluation information storage means, and the action determination means selects the identifier associated with the policy having the highest quality from the policy evaluation information stored in the policy evaluation information storage means, and determines the action in accordance with the policy indicated by the selected identifier.

(Supplementary Note 10)

A control apparatus comprising:

the policy creation apparatus according to any one of Supplementary Notes 1 to 9; and a controller configured to perform control regarding the object in accordance with the action determined by the policy creation apparatus.

(Supplementary Note 11)

A policy creation method comprising:

creating a plurality of policies each including a predetermined number of rules in which a condition for determining a state of an object is combined with an action in the state;

determining, for each of the plurality of policies that have been created, an action to be performed while a state of the object is changed from a first state to a second state in accordance with the policy; and determining, in accordance with a difference between a state between the first state and the second state and a desired state, the quality of the determined action and determining, for each of the plurality of policies, the quality of the policy based on the determined quality of the action; and selecting the policy that is determined to have a high quality from among the plurality of policies that have been created.

(Supplementary Note 12)

A non-transitory computer readable medium storing a policy creation program for causing a computer to achieve:

a function of creating a plurality of policies each including a predetermined number of rules in which a condition for determining a state of an object is combined with an action in the state;

a function of determining, for each of the plurality of policies that have been created, an action to be performed while a state of the object is changed from a first state to a second state in accordance with the policy;

a function of determining, in accordance with a difference between a state between the first state and the second state and a desired state, the quality of the determined action and determining, for each of the plurality of policies, the quality of the policy based on the determined quality of the action; and a function of selecting the policy that is determined to have a high quality from among the plurality of policies that have been created.

While the present disclosure has been described above with reference to the example embodiments, the present disclosure is not limited to the above example embodiments. Various changes that may be understood by those skilled in the art within the scope of the present disclosure can be made to the configurations and the details of the present disclosure.

This application is based upon and claims the benefit of priority from Japanese Patent Application No. 2018-244598, filed on Dec. 27, 2018, the disclosure of which is incorporated herein in its entirety by reference.

REFERENCE SIGNS LIST

101 Policy Creation Apparatus
102 Policy Creation Unit
103 Action Determination Unit
104 Policy Evaluation Unit
105 Policy Selection Unit
106 Distribution Update Unit
107 Policy Evaluation Information Storage Unit
108 Action Evaluation Unit
109 Comprehensive evaluation Unit
150 Control Apparatus
151 Controller
170 Target
201 Policy Creation Apparatus
202 Policy Creation Unit
203 Action Determination Unit
204 Policy Evaluation Unit
205 Policy Selection Unit
211 Action
212 Action
213 Action
214 Action

The invention claimed is:

1. A policy creation apparatus comprising:
hardware, including a processor and memory;
policy creation unit implemented at least by the hardware and configured to create a plurality of policies each including a predetermined number of rules in which a condition for determining a state of an object is combined with an action in the state;
action determination unit implemented at least by the hardware and configured to determine, for each of the plurality of policies that have been created, an action to be performed while a state of the object is changed from a first state to a second state in accordance with the policy;
policy evaluation unit implemented at least by the hardware and configured to determine, in accordance with a difference between a state between the first state and the second state and a desired state, the quality of the determined action and to determine, for each of the plurality of policies, the quality of the policy based on the determined quality of the action; and
policy selection unit implemented at least by the hardware and configured to select the policy that is determined to have a high quality from among the plurality of policies that have been created.

2. The policy creation apparatus according to claim 1, wherein
the policy is expressed by a policy parameter that follows at least one predetermined distribution, and
the policy creation unit determines each of the condition and the action in the policy by calculating the value of the policy parameter in accordance with the distribution.

3. The policy creation apparatus according to claim 2, further comprising distribution update unit implemented at least by the hardware and configured to update the distribution regarding the policy parameter from the policy parameter selected by the policy selection unit,
wherein the policy creation unit creates the policy by calculating the value of the policy parameter in accordance with the distribution updated by the distribution update unit.

4. The policy creation apparatus according to claim 2, wherein
the condition in the rule comprises at least some kinds of feature amounts among a plurality of kinds of feature amounts regarding the object and a determination criterion for determining observation values regarding the feature amounts, and
the policy creation unit selects the feature amount in the condition based on the policy parameters regarding the feature amounts calculated in accordance with the distribution.

5. The policy creation apparatus according to claim 4, wherein the policy creation unit calculates, for each of some kinds of feature amounts, the policy parameter regarding the feature amount and selects the feature amount regarding the policy parameters whose values are high among the calculated policy parameters as the feature amount in the condition.

6. The policy creation apparatus according to claim 4, wherein the policy creation unit calculates the determination criterion regarding the selected feature amount in the condition based on a range of observation values of the feature amount and the policy parameter regarding the determination criterion calculated in accordance with the distribution.

7. The policy creation apparatus according to claim 2, wherein the policy creation unit calculates the policy parameter regarding the action in the rule in accordance with the distribution and determines the action in the rule based on the calculated policy parameter regarding the action.

8. The policy creation apparatus according to claim 1, wherein
the policy creation unit creates the policy in accordance with a tree structure composed of terminal nodes and non-terminal nodes different from the terminal nodes,
the conditions are arranged in the non-terminal nodes in the tree structure, and
the actions in accordance with the conditions arranged in the non-terminal nodes leading to the terminal nodes are arranged in the terminal nodes in the tree structure.

9. The policy creation apparatus according to claim 1, further comprising policy evaluation information storage unit implemented at least by the hardware and configured to store policy evaluation information in which the quality of the policy determined by the policy evaluation unit is associated with an identifier indicating the policy, wherein
the policy evaluation unit stores the policy evaluation information in which the determined quality of the policy is associated with the identifier of the policy in the policy evaluation information storage unit, and
the action determination unit selects the identifier associated with the policy having the highest quality from the policy evaluation information stored in the policy evaluation information storage unit, and determines the action in accordance with the policy indicated by the selected identifier.

10. A policy creation method comprising:
creating a plurality of policies each including a predetermined number of rules in which a condition for determining a state of an object is combined with an action in the state;
determining, for each of the plurality of policies that have been created, an action to be performed while a state of the object is changed from a first state to a second state in accordance with the policy; and determining, in accordance with a difference between a state between the first state and the second state and a desired state, the quality of the determined action and determining, for each of the plurality of policies, the quality of the policy based on the determined quality of the action; and selecting the policy that is determined to have a high quality from among the plurality of policies that have been created.

11. A non-transitory computer readable medium storing a policy creation program for causing a computer to achieve:

a function of creating a plurality of policies each including a predetermined number of rules in which a condition for determining a state of an object is combined with an action in the state;

a function of determining, for each of the plurality of policies that have been created, an action to be performed while a state of the object is changed from a first state to a second state in accordance with the policy;

a function of determining, in accordance with a difference between a state between the first state and the second state and a desired state, the quality of the determined action and determining, for each of the plurality of policies, the quality of the policy based on the determined quality of the action; and a function of selecting the policy that is determined to have a high quality from among the plurality of policies that have been created.

* * * * *